US012331707B2

(12) United States Patent
Oosawa

(10) Patent No.: US 12,331,707 B2
(45) Date of Patent: Jun. 17, 2025

(54) INTAKE MANIFOLD AND OUTBOARD MOTOR

(71) Applicant: MIKUNI CORPORATION, Tokyo (JP)

(72) Inventor: Hirobumi Oosawa, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/587,997

(22) Filed: Feb. 27, 2024

(65) Prior Publication Data

US 2024/0337231 A1 Oct. 10, 2024

(30) Foreign Application Priority Data

Apr. 6, 2023 (JP) ................................ 2023-061805
Nov. 7, 2023 (JP) ................................ 2023-190127

(51) Int. Cl.
*F02M 35/10* (2006.01)
*F02M 35/116* (2006.01)
*F02M 35/16* (2006.01)

(52) U.S. Cl.
CPC ...... *F02M 35/116* (2013.01); *F02M 35/1038* (2013.01); *F02M 35/167* (2013.01)

(58) Field of Classification Search
CPC . F02M 35/116; F02M 35/1038; F02M 35/167
See application file for complete search history.

(56) References Cited

U.S. PATENT DOCUMENTS 5,941,205 A * 8/1999 Hiraoka ........... F02M 35/10045 123/184.35
2006/0102128 A1* 5/2006 Iwata .................. F02B 27/0221 123/184.35

FOREIGN PATENT DOCUMENTS

CN 204312229 U * 5/2015
JP 2003247467 9/2003
JP 2005023844 1/2005
JP 2020101096 7/2020
JP 2023142637 A * 10/2023

* cited by examiner

*Primary Examiner* — Syed O Hasan
(74) *Attorney, Agent, or Firm* — JCIPRNET

(57) ABSTRACT

An intake manifold includes: a surge tank, die-molded to temporarily store intake air; and branch pipes, in communication with the surge tank. The surge tank includes, on an outer wall thereof, a flange part and a reinforcement rib, a sensor unit configured to detect an intake air state quantity being installed to the a part. The flange part includes: a fitting hole, having an axis as a center to be fit with a detection part of the sensor unit; and boss parts, provided on a periphery of the fitting hole, and the flange part is formed to be rotationally symmetric with the axis as a center. The reinforcement rib includes a limitation piece interfering with a portion of the sensor unit to limit assembling at a time when the sensor unit is assembled erroneously for being deviated from a normal orientation.

11 Claims, 21 Drawing Sheets

INTAKE MANIFOLD AND OUTBOARD MOTOR

CROSS-REFERENCE TO RELATED APPLICATION

This application claims the priority benefit of Japan application serial no. 2023-061805, filed on Apr. 6, 2023 and Japan application serial no. 2023-190127, filed on Nov. 7, 2023. The entirety of each of the above-mentioned patent applications is hereby incorporated by reference herein and made a part of this specification.

BACKGROUND

Technical Field

The invention relates to an intake manifold suitable for an intake system of an engine, such as an outboard motor, and particularly relates to an intake manifold in which a surge tank is die-molded and a sensor unit is assembled to an outer wall of the surge tank, as well as a outboard motor in which the intake manifold is mounted.

Description of Related Art

As a conventional intake manifold of an engine for an outboard motor, an intake manifold with a configuration as following is known: a left intake pipe and a left surge tank, disposed on a left outer side of a cylinder block of a V-type multi-cylinder engine and a right intake pipe and a right surge tank, disposed on a right outer side of the cylinder block, so as to surround the periphery of the cylinder block; and a throttle body, interposed between the left surge tank and the right surge tank (see, for example, Patent Document 1).

Also, as another intake manifold of an engine for an outboard motor, an intake manifold with a configuration as follows is known: a left intake pipe and a left surge tank, disposed on an outer side of a left cylinder head of a V-type multi-cylinder engine and a right intake pipe and a right surge tank, disposed on an outer side of a right cylinder head, so as to surround cylinder heads on both sides of the V-type multi-cylinder engine; and a throttle body, linked to the left surge tank. The left surge tank and the right surge tank are in connection and communication with each other, and multiple fixing parts formed to protrude from outer edge parts of the left surge tank and the right surge tank are provided (see, for example, Patent Document 2).

Moreover, as another intake manifold of an engine for an outboard motor, an intake manifold with a configuration as follows is known: a left intake pipe and a left surge tank, disposed on a left outer side of a cylinder block of a V-type multi-cylinder engine and a right intake pipe and a right surge tank, disposed on a right outer side of the cylinder block, so as to surround the periphery of the cylinder block; and an elbow, linking the left surge tank and the right surge tank and defining an air passage; and a throttle body, linked to the elbow. A flange is provided at the elbow on a downstream side with respect of the throttle body, and an intake air temperature sensor is assembled to the flange part (see, for example, Patent Document 3).

As described above, in the conventional intake manifold, in the case where various functional components or a sensor unit is to be assembled to the outer wall of the surge tank, it is necessary to provide a dedicated boss part and flange part while securing mechanical strength.

Therefore, at the time of die-molding a boss part and a flange part together with a reinforcement rib for securing the mechanical strength on the outer wall of the surge tank, there is a concern that a sink mark (indentation, sink hole) may occur due to local shrinkage during cooling after molding, the dimension accuracy may deteriorate, and the functional reliability may be affected.

In addition, regarding the flange part to which the sensor unit is assembled, although there is no problem in the case of an asymmetric shape, an assembling error where the assembling orientation of the sensor unit is incorrect may occur in the case of rotational symmetry, such as two-fold symmetry (i.e., point symmetry) where it is possible to assemble the sensor unit even at an incorrect position rotated by 180 degrees from a normally assembled state.

PRIOR ART DOCUMENT(S)

Patent Document(s)

[Patent Document 1] Japanese Laid-open No. 2005-23844

[Patent Document 2] Japanese Laid-open No. 2020-101096

[Patent Document 3] Japanese Laid-open No. 2003-247467

The invention provides an intake manifold and an outboard motor including the intake manifold which can prevent an assembling error from occurring at the time of assembling a sensor unit and can secure mechanical strength.

SUMMARY

An intake manifold according to an aspect of the invention is an intake manifold suitable for an engine and includes: a surge tank, die-molded to temporarily store intake air; and branch pipes, in communication with the surge tank. The surge tank includes, on an outer wall of the surge tank, a flange part and a reinforcement rib. A sensor unit configured to detect a state quantity of the intake air is installed to the flange part. The flange part includes: a fitting hole, having a predetermined axis as a center so as to be fit with a detection part of the sensor unit; and multiple boss parts, provided on a periphery of the fitting hole, and the flange part is formed to be rotationally symmetric with the axis as a center. The reinforcement rib includes a limitation piece interfering with a portion of the sensor unit to limit assembling at a time when the sensor unit is assembled erroneously for being deviated from a normal orientation.

DESCRIPTION OF THE EMBODIMENTS

Figure 1:
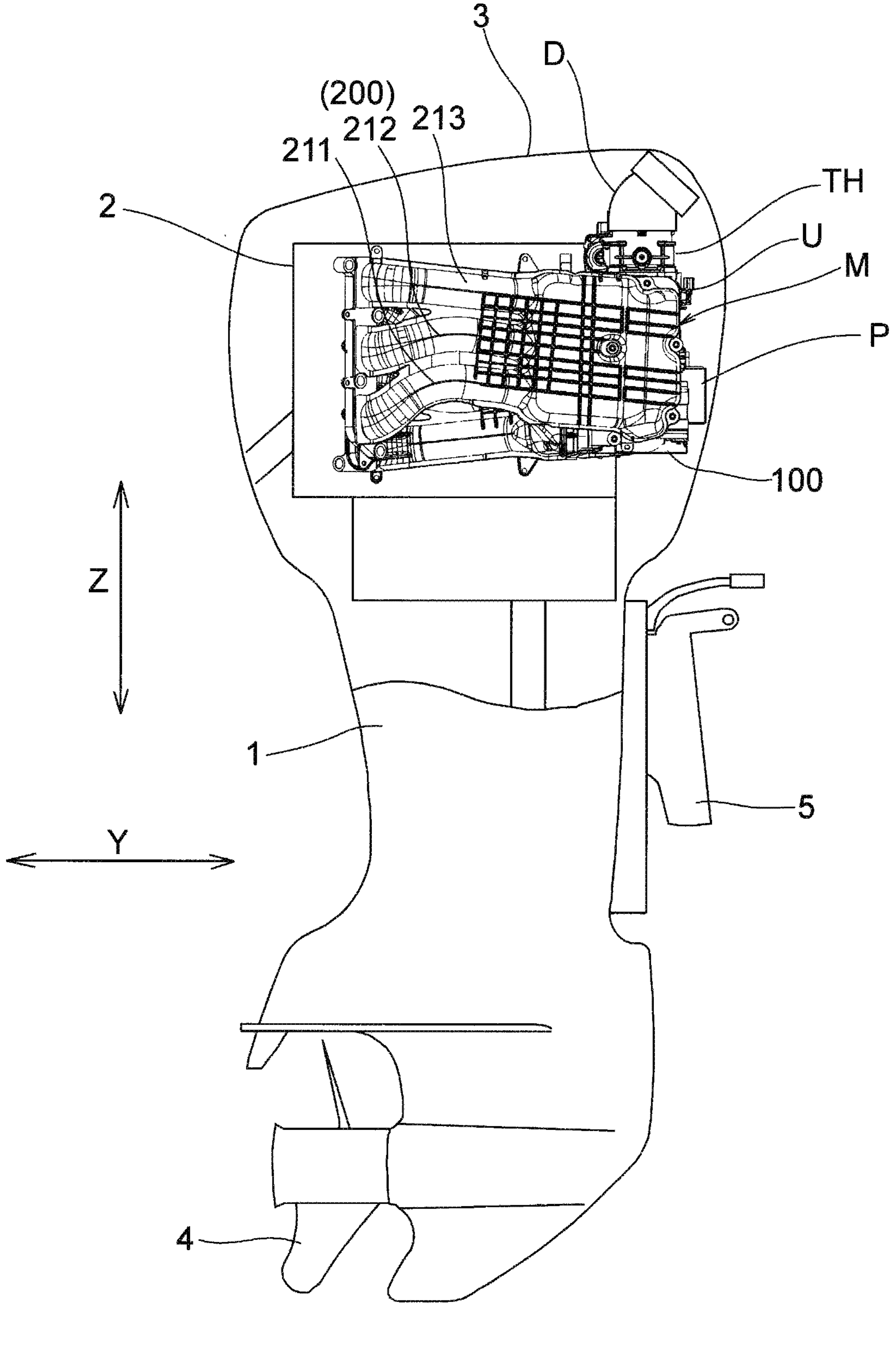
FIG. 1 is a side view schematically illustrating an outboard motor in which an engine including an intake manifold according to an embodiment of the invention is mounted, and is a side view when the engine is partially cut off and viewed in a horizontal direction.

An intake manifold according to an aspect of the invention is an intake manifold suitable for an engine and includes: a surge tank, die-molded to temporarily store intake air; and branch pipes, in communication with the surge tank. The surge tank includes, on an outer wall of the surge tank, a flange part and a reinforcement rib. A sensor unit configured to detect a state quantity of the intake air is installed to the flange part. The flange part includes: a fitting hole, having a predetermined axis as a center so as to be fit with a detection part of the sensor unit; and multiple boss parts, provided on a periphery of the fitting hole, and the flange part is formed to be rotationally symmetric with the axis as a center. The reinforcement rib includes a limitation piece interfering with a portion of the sensor unit to limit assembling at a time when the sensor unit is assembled erroneously for being deviated from a normal orientation.

In the intake manifold, it may also be configured that the limitation piece is formed with a thickness same as a plate thickness of the reinforcement rib and is formed to protrude in parallel with the axis.

In the intake manifold, it may also be configured that the flange part has a bonding surface perpendicular to the axis, so as to be bonded to a bonding part of the sensor unit, and the limitation piece is formed to protrude with respect to the bonding surface in a direction of the axis.

In the intake manifold, it may also be configured that the limitation piece has a curved outer profile in a convex shape.

In the intake manifold, it may also be configured that the flange part has two boss parts arranged on a first line perpendicular to the axis and is formed to be point-symmetric with the axis as a center, and the reinforcement rib includes a parallel reinforcement rib extending in parallel with the first line in a vicinity of the flange part, and the limitation piece is formed on the parallel reinforcement rib.

In the intake manifold, it may also be configured that on the parallel reinforcement rib, the limitation piece is formed to be line-symmetric with respect to a second line perpendicular to the axis and the first line.

In the intake manifold, it may also be configured that at least a portion of the outer wall of the surge tank includes a plate-shaped outer wall formed in a plate shape, and the flange part is formed on the plate-shaped outer wall, the reinforcement rib includes a lattice-like reinforcement rib formed on the plate-shaped outer wall, and the limitation piece is formed on the lattice-like reinforcement rib.

In the intake manifold, it may also be configured that the surge tank includes nuts outserted to the boss parts.

In the intake manifold, it may also be configured that the branch pipes include a first branch pipe module and a second branch pipe module each defining at least one branch passage, and the surge tank is formed in a cylindrical shape defining a first opening part and a second opening part on both ends, and includes: a first flange part, connected with the first branch pipe module on a periphery of the first opening part; a second flange part, connected with the second branch pipe module on a periphery of the second opening part; a third flange part, connected with a throttle body on a periphery of the inlet.

In addition, an outboard motor according to another aspect of the invention includes: an engine, having an intake manifold; a body, to which the engine is fixed; a propeller, configured to be rotated by a driving force of the engine; a sensor unit, assembled to the intake manifold and detecting a state quantity of intake air; and an engine cover, covering the engine. As the intake manifold, the intake manifold formed with any of the above configurations is adopted.

In the outboard motor, it may also be configured that the sensor unit includes: a detection part, fit with the fitting hole of the intake manifold; a bonding part, integrally formed with the detection part and bonded to the flange part of the intake manifold; and a connector for electrical connection.

In the outboard motor, it may also be configured that the connector is formed to interfere with the limitation piece of the intake manifold at the time when the sensor unit is assembled erroneously for being deviated from the normal orientation In the outboard motor, it may also be configured that the sensor unit includes: a pressure sensor, detecting a pressure of the intake air; and a temperature sensor, detecting a temperature of the intake air.

According to the intake manifold with such configuration, an assembling error can be prevented from occurring at the time of assembling a sensor unit, and mechanical strength can be secured. In addition, by providing the intake manifold with such configuration, a reliable outboard motor can be provided.

In the following, the embodiments of the invention will be described with reference to the drawings.

An intake manifold according to the invention is die-molded by using a resin material, and is disposed between a throttle body and a cylinder head of an engine body, the throttle body being located downstream of an intake duct in an intake system of the engine. Here, as an embodiment, the case where the intake manifold is suitable for an engine of an outboard motor is described.

Figure 2:
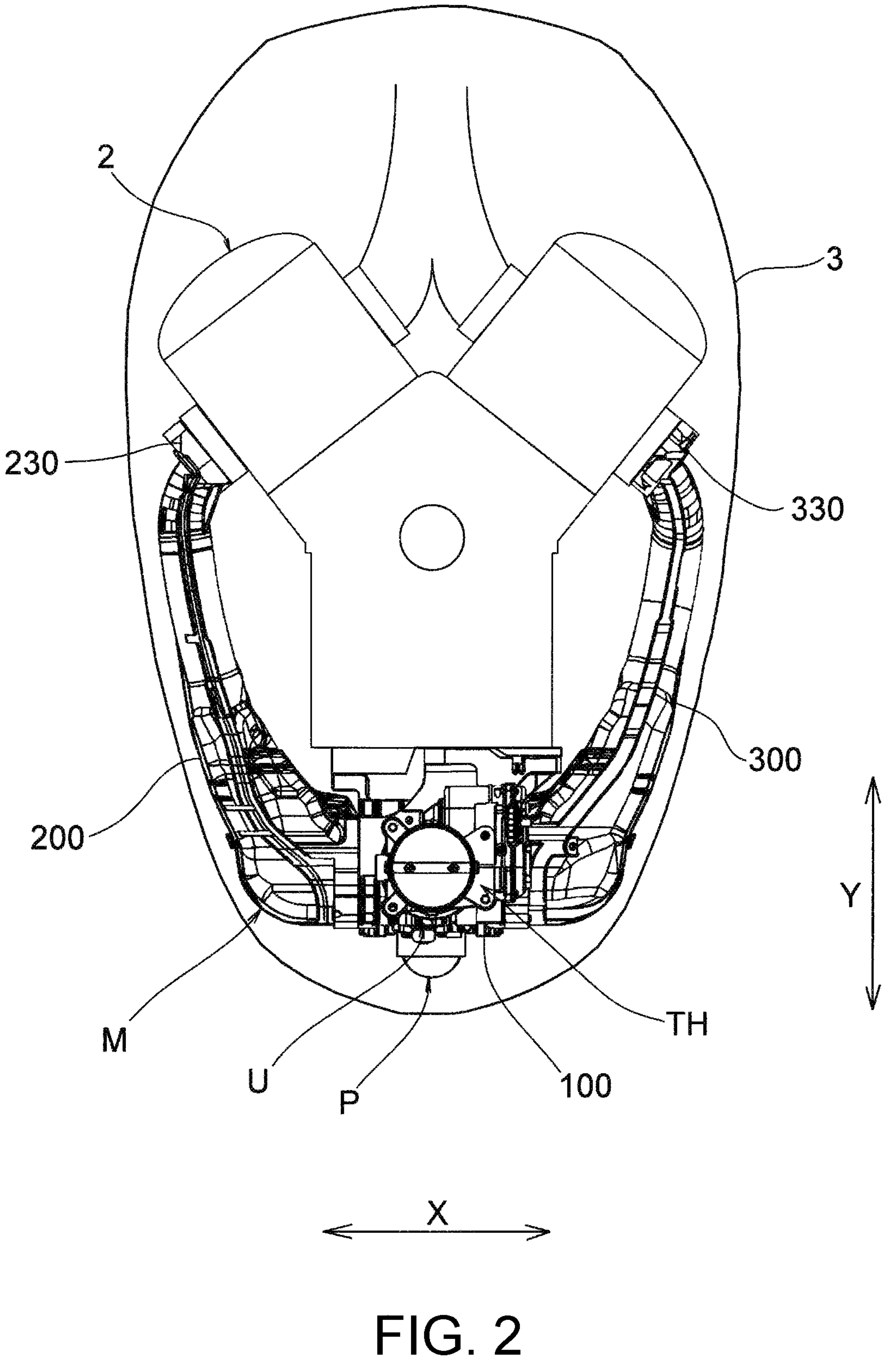
FIG. 2 is a plan view schematically illustrating the outboard motor in which the engine including the intake manifold according to an embodiment is mounted, and is a plan view in which the upper part of an engine cover is cut off and which is viewed from the upper side in the horizontal direction.
Figure 3:
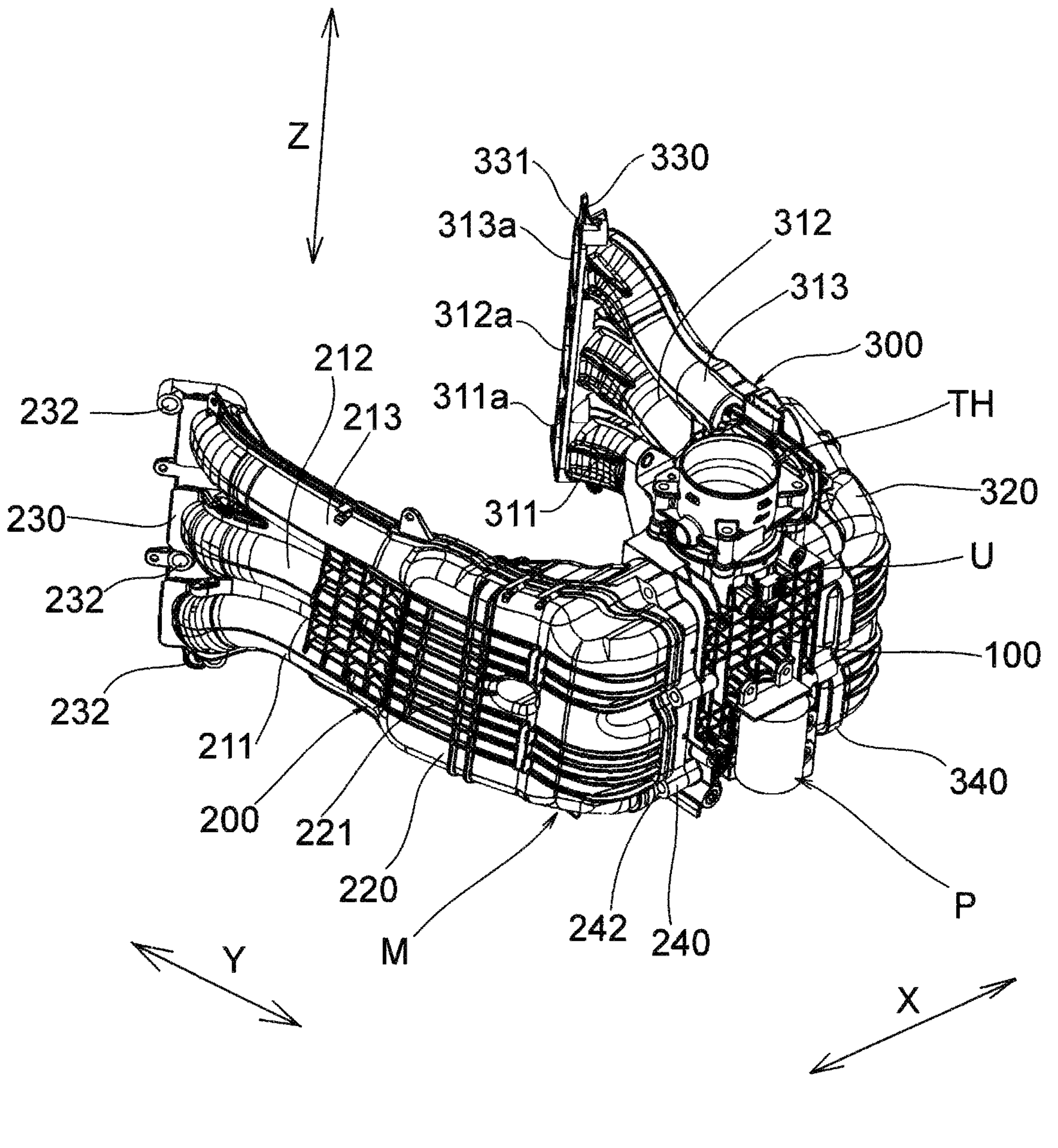
FIG. 3 is an appearance perspective view illustrating the intake manifold according to an embodiment, a throttle body assembled to a surge tank, a sensor unit, and a functional component, etc., when viewed obliquely in a direction.

The outboard motor is a motor mounted to the rear part of a ship body to generate a propulsion force. As shown in FIGS. 1 and 2, the outboard motor includes a body 1, an engine 2 fixed to the body 1, an engine cover 3 covering the engine 2, a propeller 4 disposed below the body 1, a gasket 5 used at the time of being installed to the ship body, a power transmission system disposed in the body 1 and transmitting power of the engine 2 to the propeller 4, and a fuel tank. For the case of description, the upright direction in which the outboard motor is mounted to the vehicle body is set as a vertical direction Z, the width direction of the outboard motor is set as a horizontal direction X, and the front-rear direction generating the propulsion force is set as a horizontal direction Y.

The engine 2 is a V-type six-cylinder internal combustion engine, and includes an engine body, an intake system, and an exhaust system. The engine body includes a cylinder block, a cylinder head, an oil pump, etc., and the intake system and the exhaust system are installed to the engine body.

The intake system includes an outside air introduction duct D, a throttle body TH, an intake manifold M, a sensor unit U installed to the intake manifold M, and a functional component P. Where necessary, the intake system may also include a resonator, a silencer, etc.

As shown in FIG. 1, in a state of being installed to the engine 2, the intake manifold M is oriented so that three sets of branch pipes among six branch pipes are arranged in the vertical direction Z together. In a starting state of the outboard motor, i.e., the engine 2, a surge tank 100 of the intake manifold M is disposed so that the outer wall (outer side wall 110) of the surge tank 100 extends in the vertical direction Z.

As shown in FIGS. 3 to 7, the intake manifold M is formed by: the surge tank 100, temporarily storing intake air; a first branch pipe module 200; and a second branch pipe module 300. In addition, in the intake manifold M, nuts N are fixed to boss holes of multiple boss parts 111, **112*b*, 121 and fitting holes 152, 162, 182, and collars C are fixed to multiple circular holes 122*a***.

The surge tank 100 is die-molded by using a resin material and formed in a cylindrical shape having an annular cross-section in a substantially rectangular shape to define a first opening part **100*a* and a second opening part 100*b* at two ends in the horizontal direction X and an internal space IS. In addition, the surge tank 100 includes an outer side wall 110, an inner side wall 120, a lower side wall 130, an upper low wall 140, a first flange part 150, a second flange part 160, an inlet 170, and a third flange part 180**.

Figure 8:
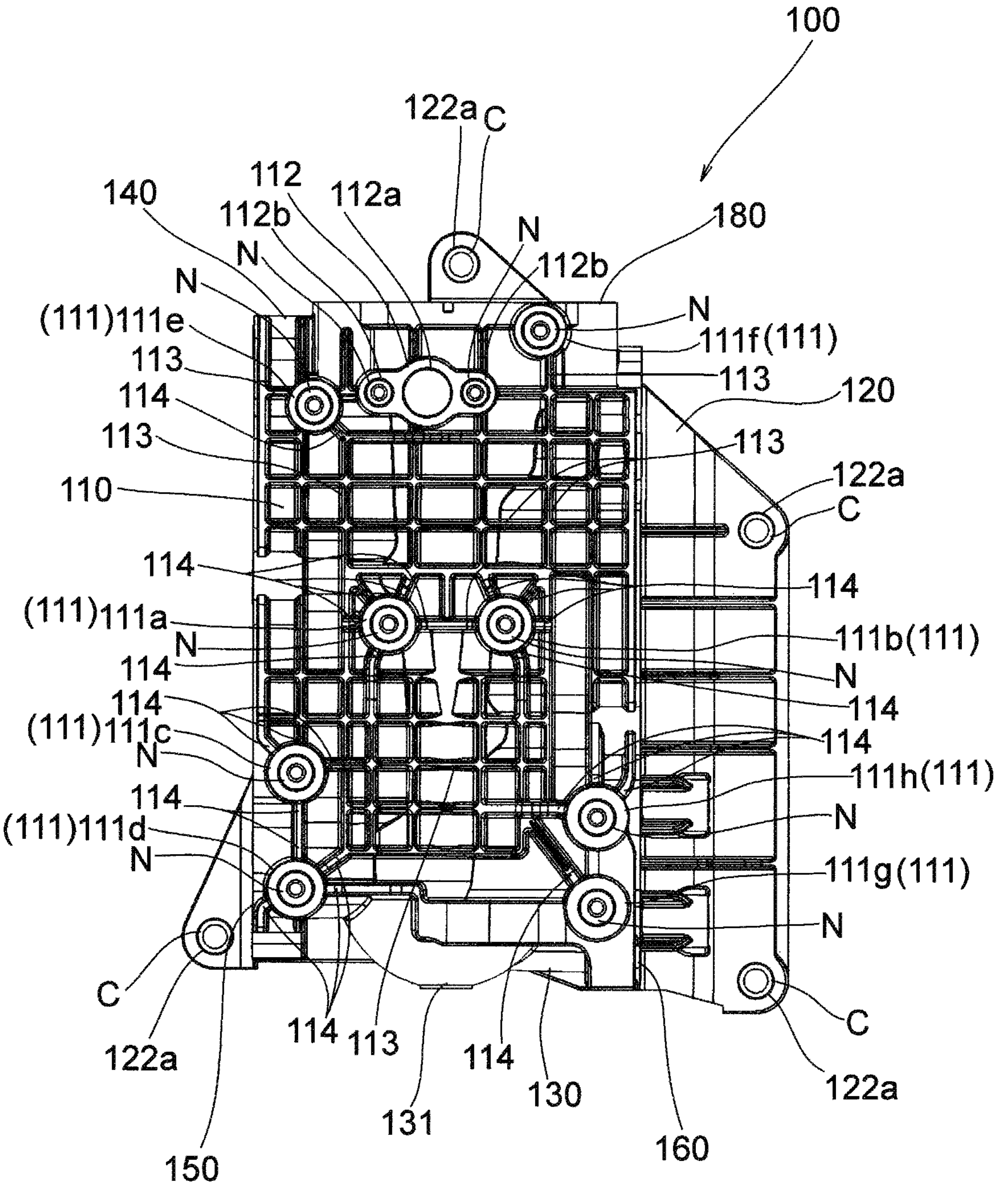
FIG. 8 is a front view illustrating the surge tank of the intake manifold according to an embodiment when viewed from the outer wall side.
Figure 9:
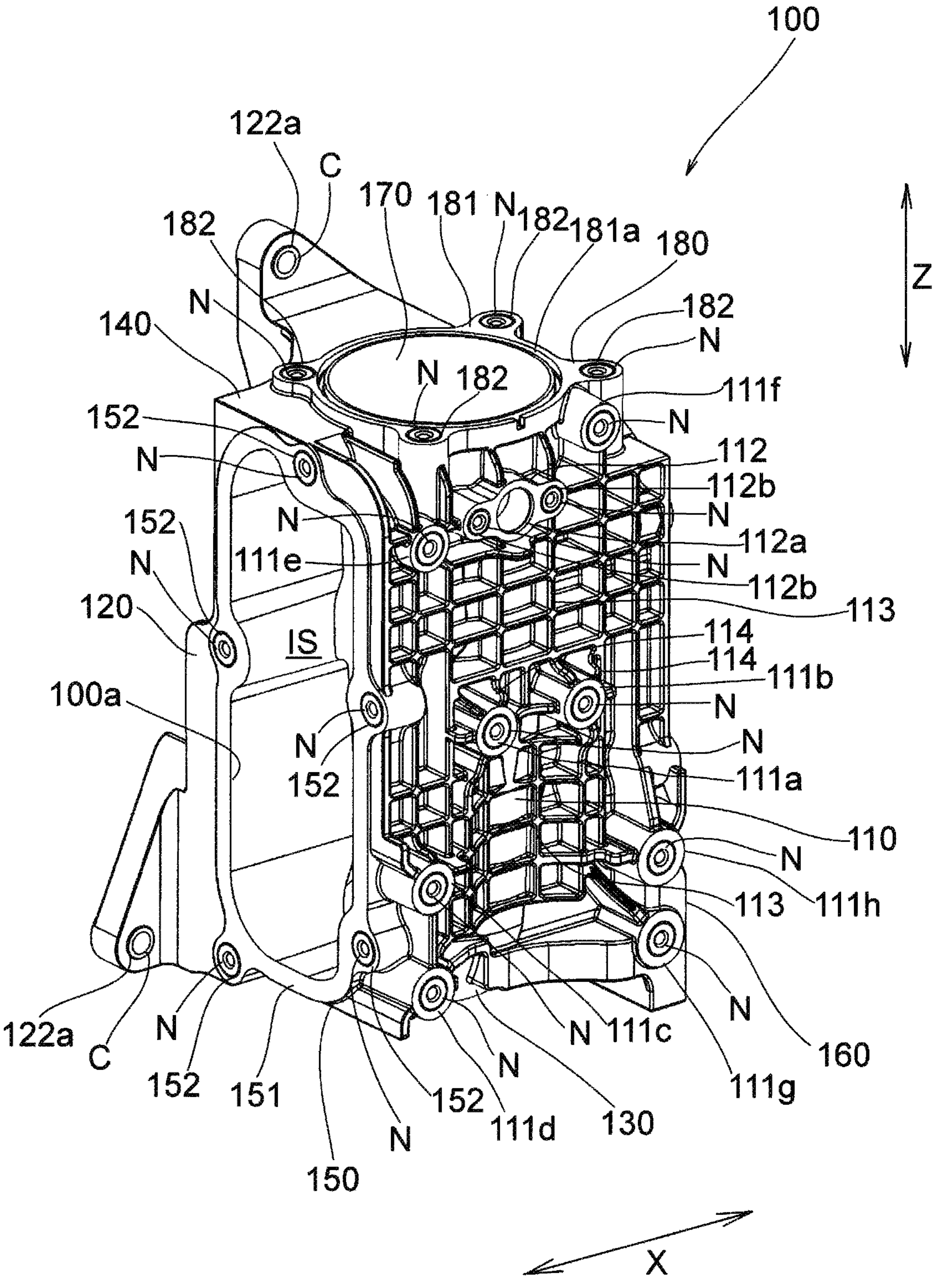
FIG. 9 is a perspective view illustrating the surge tank of the intake manifold according to an embodiment when viewed obliquely in a direction.
Figure 10:
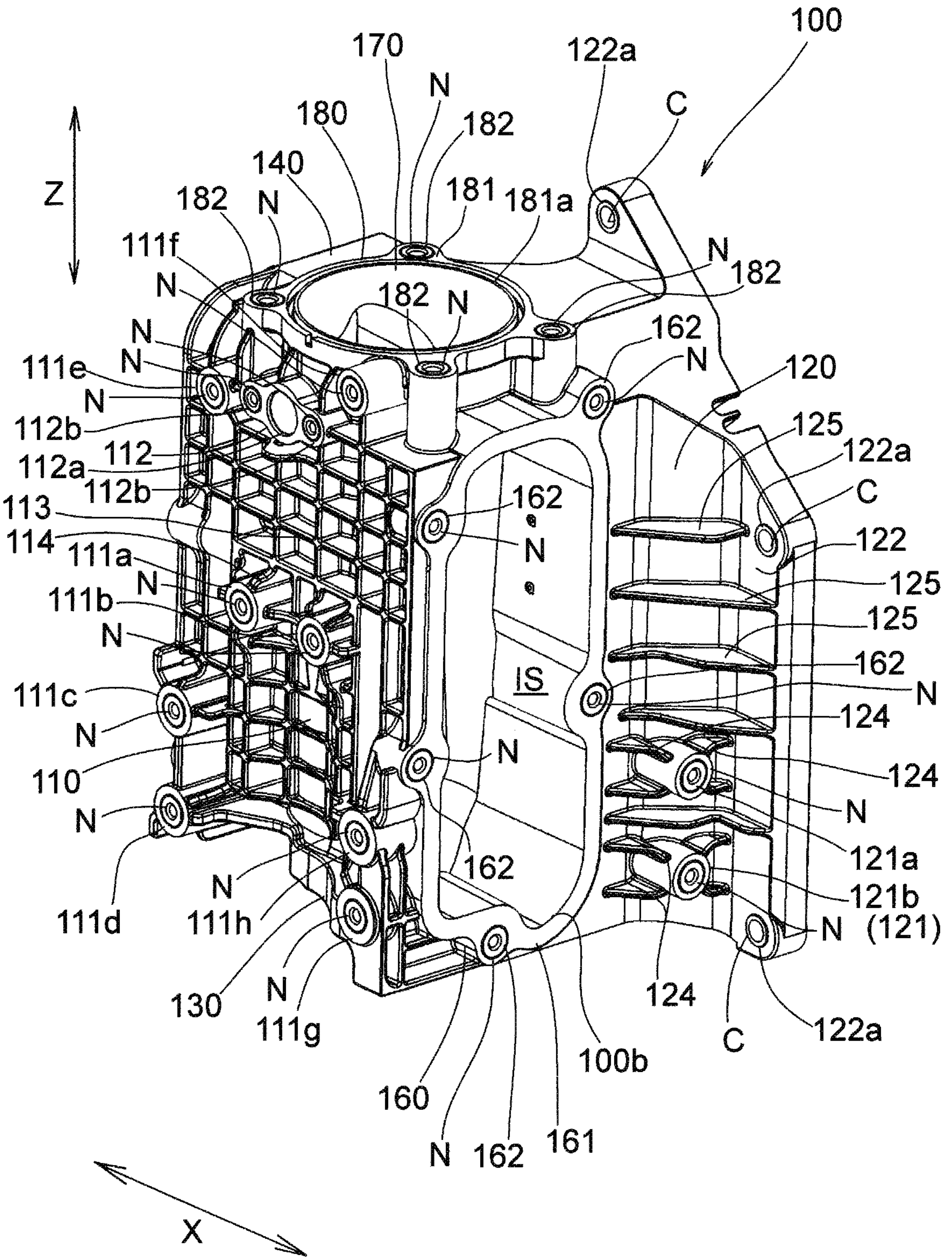
FIG. 10 is a perspective view illustrating the surge tank of the intake manifold according to an embodiment when viewed obliquely in another direction.

The outer side wall 110 forms a portion of the outer wall and is a plate-shaped outer wall formed in a plate shape to extend in the vertical direction Z in the starting state of the engine 2. As shown in FIGS. 8 to 10, the outer side wall 110 includes multiple boss parts 111 (**111*a*, 111*b*, 111*c*, 111*d*, 111*e*, 111*f*, 111*g*, 111*h*), a flange part 112 for assembling the sensor unit U, and a lattice-like reinforcement rib 113 and boss reinforcement ribs 114** as reinforcement ribs.

The boss part 111 is formed in a cylindrical shape protruding vertically from the wall surface of the outer side wall 110, and the nut N is outserted (fit) to the boss part 111.

Here, the functional component P is fastened and fixed to the boss parts **111*a*, 111*b* by using bolts b1. Also, other functional components, such as a bracket fixing the engine cover 3, a component for electronic control, and other components, are fastened and fixed to the boss parts 111*c*, 111*d*, 111*e*, 111*f*, 111*g*, 111*h*** by using bolts (not shown).

The flange part 112 is a region where the sensor unit U is assembled. As shown in FIGS. 8 to 10, the flange part 112 is formed at a position offset toward the upper side wall 140 at the substantial center of the outer side wall 110, so as to protrude vertically from the wall surface of the outer side wall 110.

Figure 11:
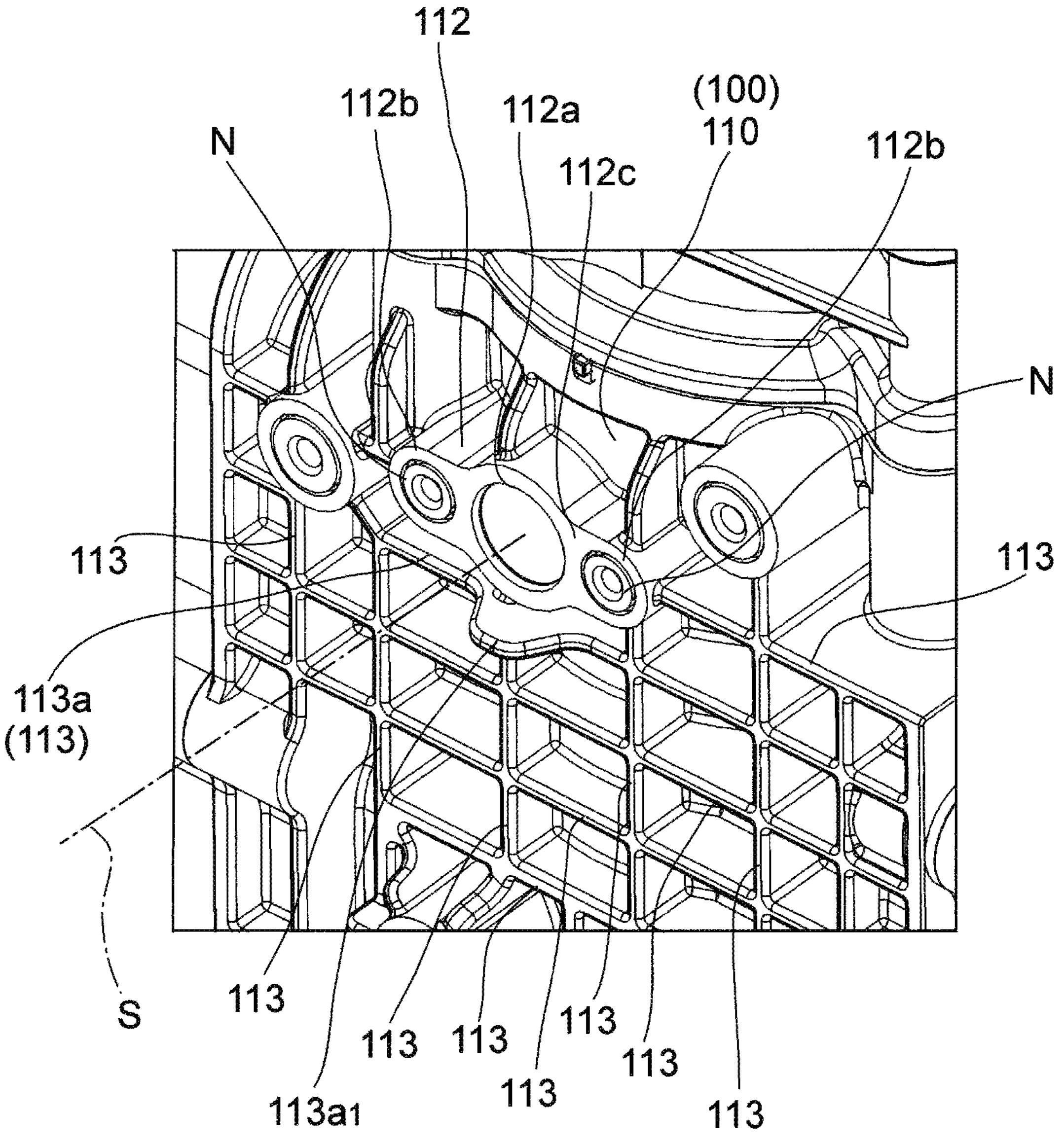
FIG. 11 is a perspective view illustrating a flange part for the sensor unit, which is formed on the outer wall of the surge tank of the intake manifold according to an embodiment, and a portion of a reinforcement rib (lattice-like reinforcement rib).
Figure 12:
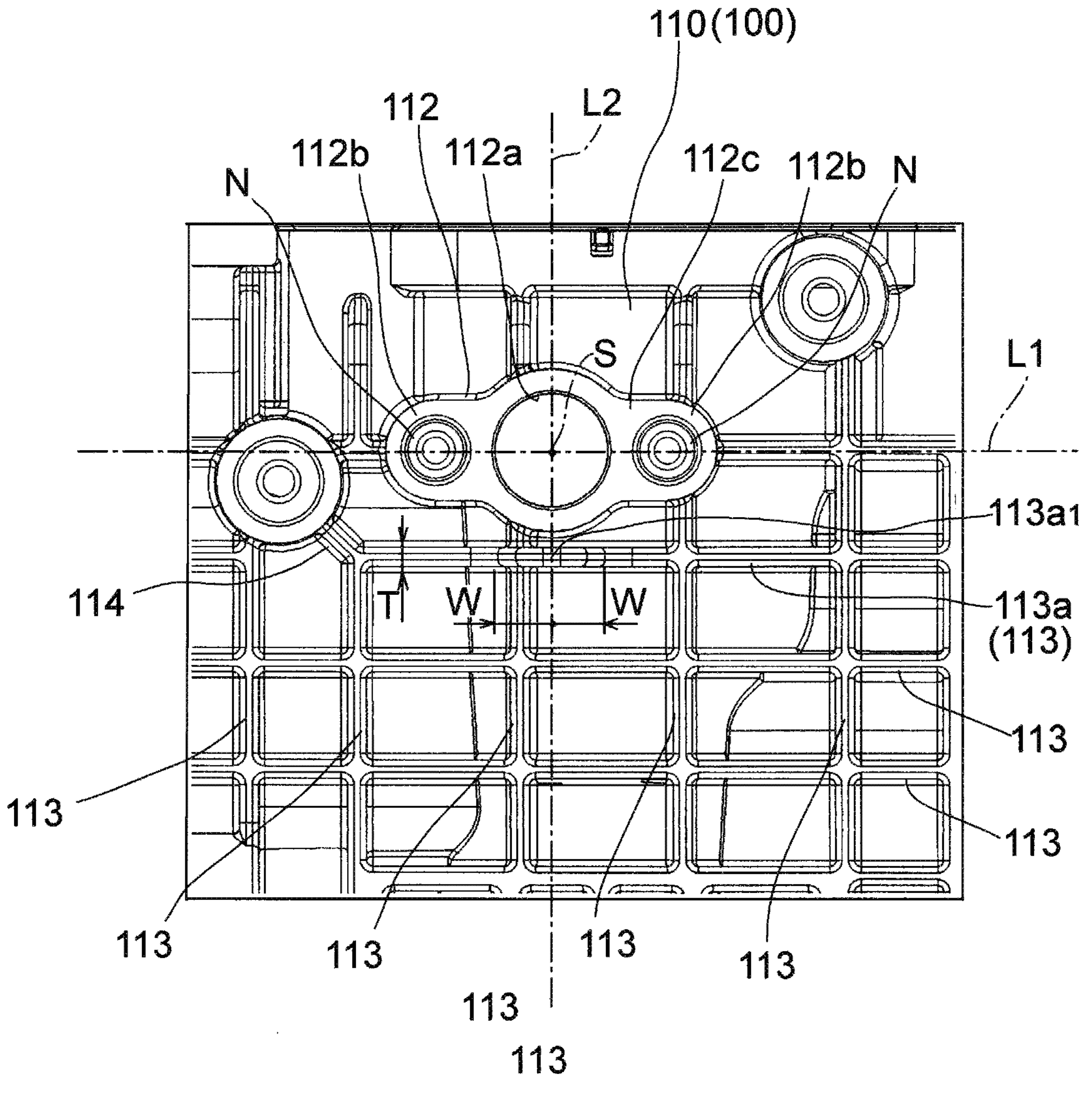
FIG. 12 is a front view illustrating the flange part for the sensor unit, which is formed on the outer of the surge tank of the intake manifold according to an embodiment, and a portion of the reinforcement rib (lattice-like reinforcement rib).
Figure 13:
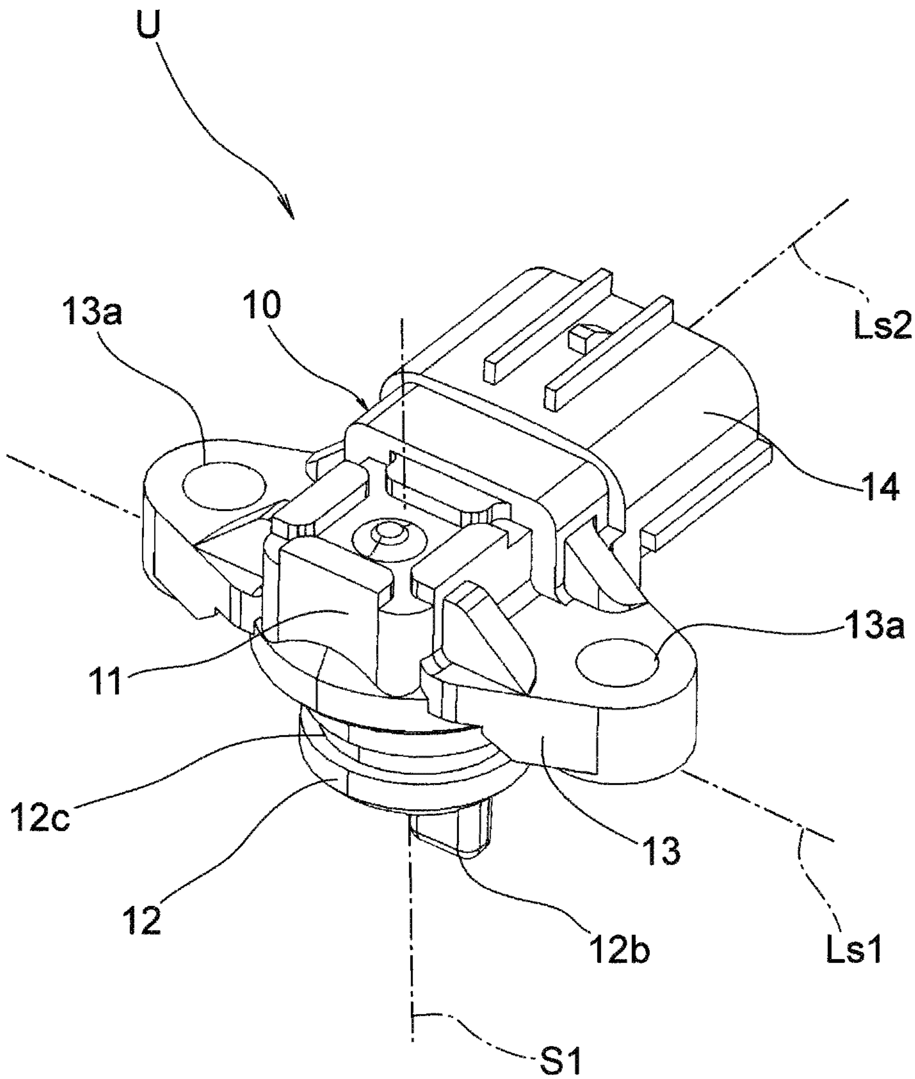
FIG. 13 is an appearance perspective view illustrating the sensor unit assembled to the intake manifold according to an embodiment.
Figure 14:
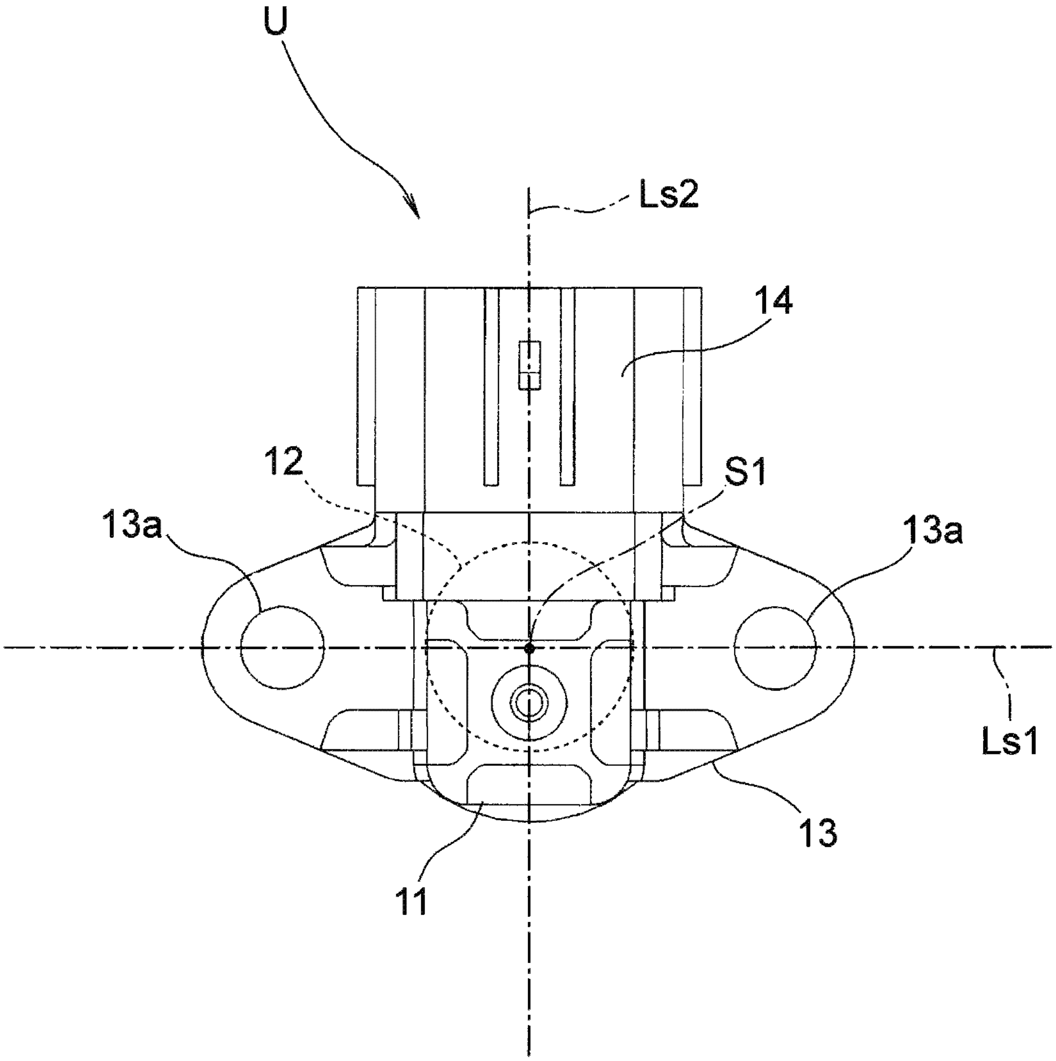
FIG. 14 is a front view illustrating the sensor unit assembled to the intake manifold according to an embodiment.
Figure 15:
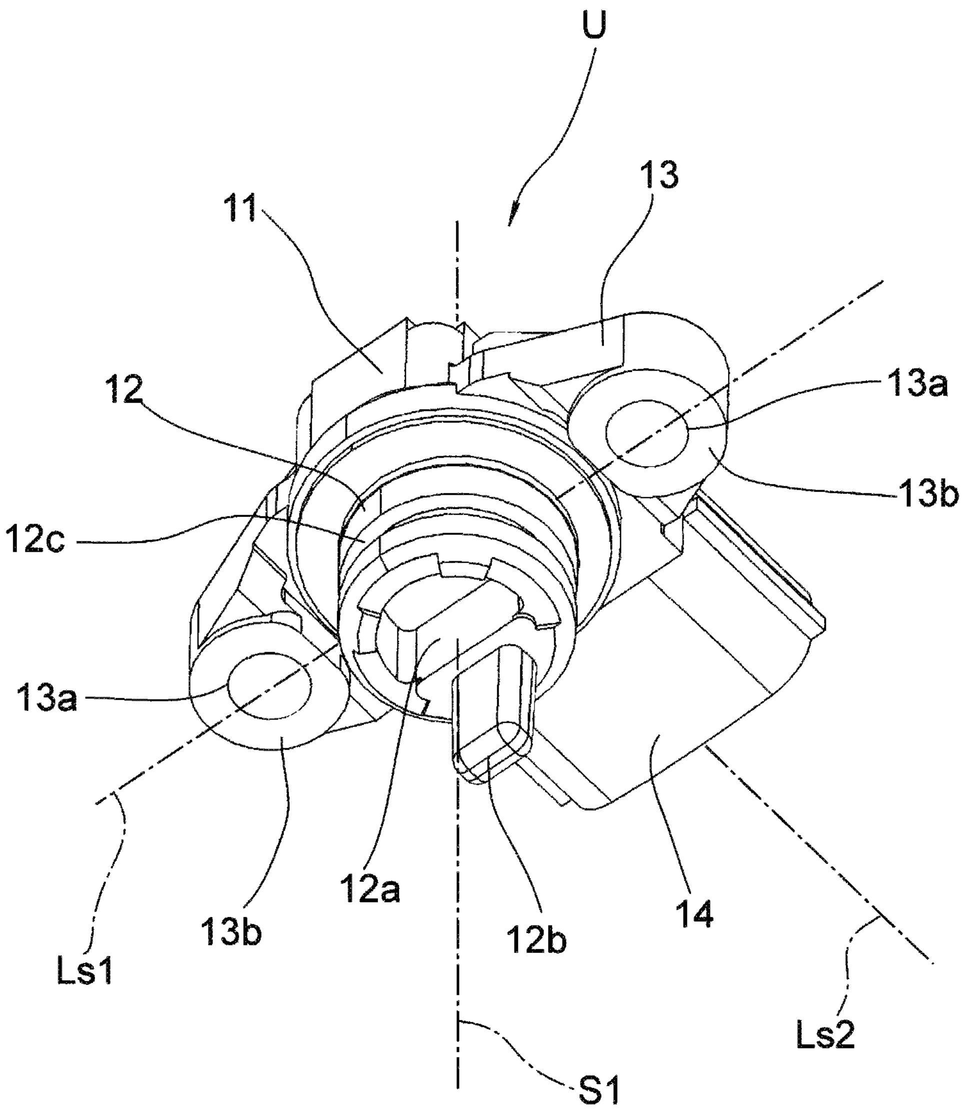
FIG. 15 is an appearance perspective view when the sensor unit assembled to the intake manifold according to an embodiment is viewed from the side of a detection part (sleeve) fit with a fitting hole of the flange part.

In addition, as shown in FIGS. 11 and 12, the flange part 112 includes a fitting hole **112*a* in communication with the internal space IS, two boss parts 112*b*, 112*b*, and a bonding surface 112*c***.

The fitting hole **112*a* is formed in a cylindrical shape with the axis S as the center, so as to fit a sleeve 12** as a detection part of the sensor unit U.

The two boss parts **112*b*, 112*b* are formed continuously with the fitting hole 112*a* on the periphery of the fitting hole 112*a*, and are arranged on a first line L1** perpendicular to the axis S and are formed to be separated by the same distance from the axis S.

The bonding surface **112*c* is a region bonded to the bonding part 13 of the sensor unit U, and is formed as a flat surface perpendicular to the axis S, so that the end surface of the fitting hole 112*a* and the end surfaces of the two boss parts 112*b*, 112*b*** are flush with each other.

Therefore, the flange part 112 is formed to be rotationally symmetric with respect to the center of the axis S. Here, the flange part 112 is formed to be two-fold symmetric, i.e., point-symmetric, where the same shape is overlapped by rotating 180 degrees.

In addition, in the flange part 112, the respective nuts N are fixed to the boss holes of the two boss parts **112*b*, 112*b*, through outsertion. In addition, the lattice-like reinforcement rib 113 extending in a direction toward the vicinities of the centers of the respective boss parts 112***b*, 112*b* is connected to the outer circumferential surfaces of the two boss parts 112*b*, 112*b*, and also serves as a boss reinforcement rib.

In addition, the sensor unit U is fastened and fixed to the flange part 112 by using the bolts b2.

The lattice-like reinforcement rib 113 forms a plate shape protruding vertically from the wall surface of the outer side wall 110, and is arranged in a lattice shape. In addition, by increasing the bending stiffness and the torsional stiffness, the lattice-like reinforcement rib 113 increases the overall surface stiffness, and increases the mechanical strength of the outer side wall 110.

Here, as shown in FIG. 12, the lattice-like reinforcement rib 113 is formed to include a parallel reinforcement rib 113*a* extending in parallel with the first line L1 along which the boss parts 112*b*, 112*b* are arranged in the vicinity of the flange part 112.

In addition, the parallel reinforcement rib 113*a* is formed integrally with a limitation piece 113$a_1$ which interferes with a portion of the sensor unit U to limit assembling at the time when the sensor unit U is assembled erroneously for being deviated from the normal orientation.

As shown in FIGS. 11 and 12, the limitation piece 113$a_1$ is formed so that the thickness of the limitation piece 113*a* is the same as a plate thickness T of the parallel reinforcement rib 113*a* (lattice-like reinforcement rib 113) and so as to protrude in parallel with the axis S. Specifically, the limitation piece 113$a_1$ is formed in a plate shape protruding with respect to the bonding surface 112*c* of the flange part 112 in the direction of the axis S.

In addition, the limitation piece 113$a_1$ has a curved outer profile in a shape convex outward in the direction of the axis S, and is line-symmetric with respect to a second line L2 perpendicular to the axis S and the first line L1. That is, in FIG. 12, the limitation piece 113$a_1$ is formed with the same width W on the left and the right with the second line L2 being the center.

In this way, since the limitation piece 113$a_1$ is integrally formed, in the same thickness with the plate thickness T the reinforcement rib, with the reinforcement rib (the lattice-like reinforcement rib 113) being provided on the plate-like outer wall 110 that is the outer wall of the surge tank 100, mechanical strength can be secured, and erroneous assembling of the sensor unit U can be limited.

In addition, since the limitation piece 113$a_1$ protrudes in the direction of the axis S with respect to the bonding surface 112*c* of the flange part 112 and is formed to be curved in a convex shape, compared with the case of being formed as a rectangular edge or like a pin, the damage of the limitation piece 113$a_1$ can be prevented, and injuries of the operator, etc., can also be prevented. Moreover, since the limitation piece 113$a_1$ is formed in the parallel reinforcement rib 113*a* provided in the vicinity of the flange part 112, compared with the case of being formed in a reinforcement rib connected with the boss parts 112*b*, 112*b*, the degree of freedom in terms of the forms and arrangements thereof is increased. Also, the operator can also easily recognize that the limitation piece 113$a_1$ is a component that limits the assembling orientation at the time of assembling the sensor unit U.

The boss reinforcement ribs 114 mainly increase the stiffness of the boss parts 111 (111*a*, 111*b*, 111*c*, 111*d*, 111*e*, 111*f*, 111*g*, 111*h*), have the plate thickness T same as the lattice-like reinforcement rib 113, and, as shown in FIG. 8, form a plate shape protruding vertically from the wall surface of the outer side wall 110 and extend in directions toward the centers of the boss parts 111 to be connected with the boss parts 111. In addition, in the boss reinforcement rib 114, a side opposite to the side connected with the boss part 111 is connected with the lattice-like reinforcement rib 113. The boss reinforcement rib 114 is formed to increase the overall stiffness.

Here, the plate thickness T of the boss reinforcement rib 114 is formed in a dimension equal to or less than the thickness of the boss part 111. In this way, by forming the plate thickness T of the boss reinforcement rib 114 to be equal to or less than the thickness of the boss part 111, at the time of cooling after die-molding, a sink mark (indentation, sink hole) where the inner wall surface of the boss hole is recessed can be particularly prevented from being generated.

Figure 4:
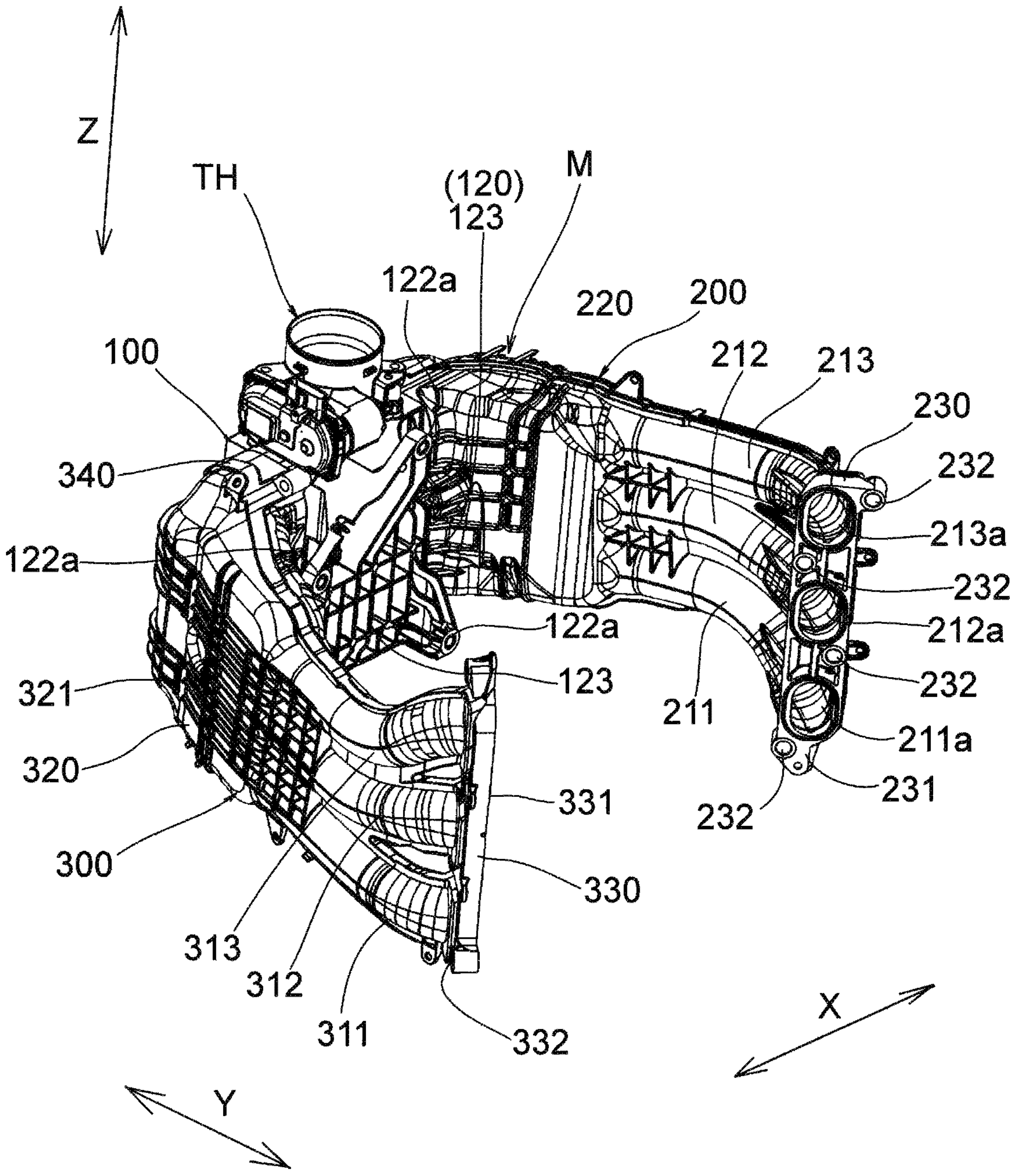
FIG. 4 is an appearance perspective view illustrating the intake manifold according to an embodiment and the throttle body assembled to the surge tank, etc., when viewed obliquely in another direction.
Figure 5:
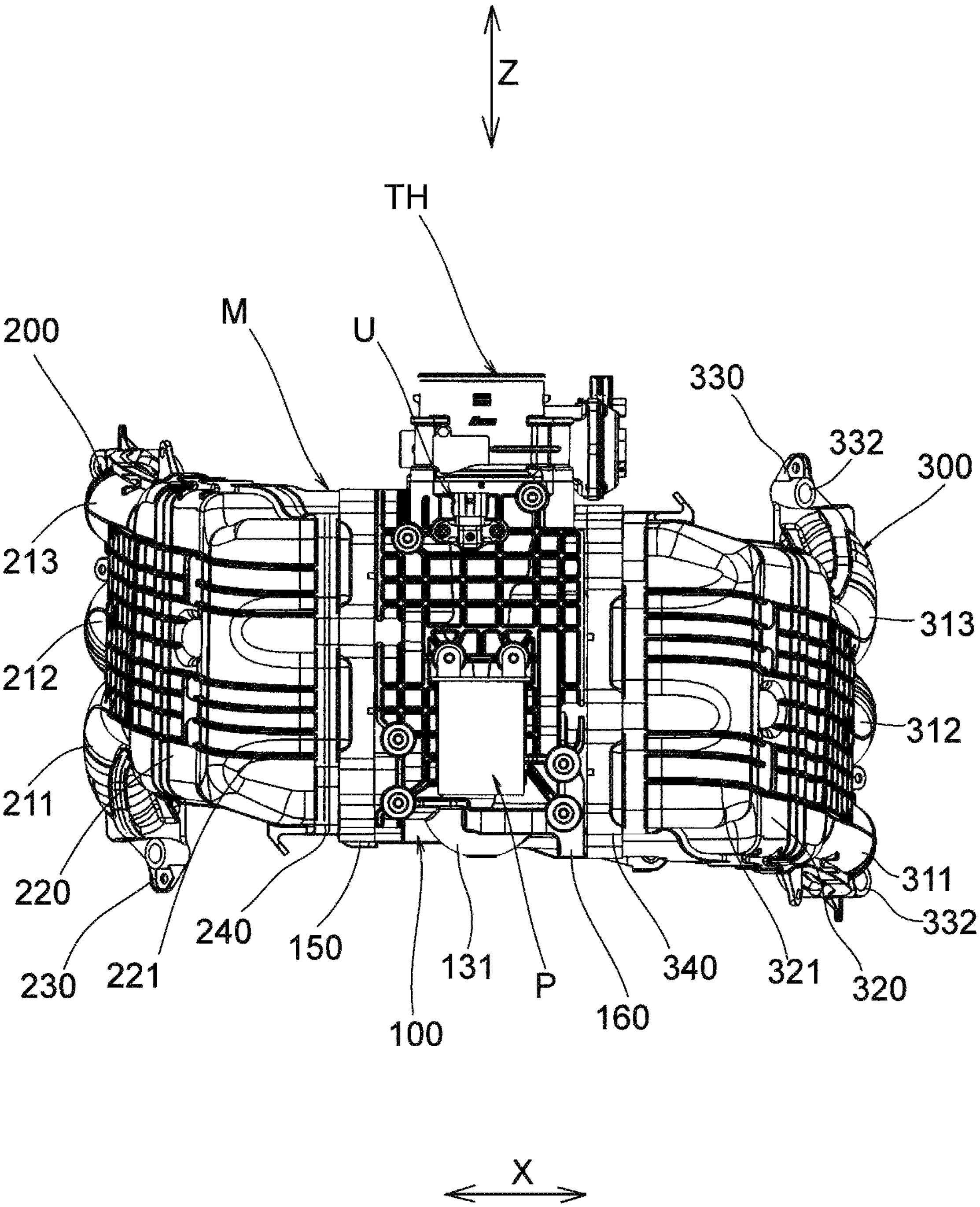
FIG. 5 is a front view illustrating the intake manifold according to an embodiment, the throttle body assembled to the surge tank, the sensor unit, and the functional component, etc., when viewed from an outer wall side of the surge tank.
Figure 6:
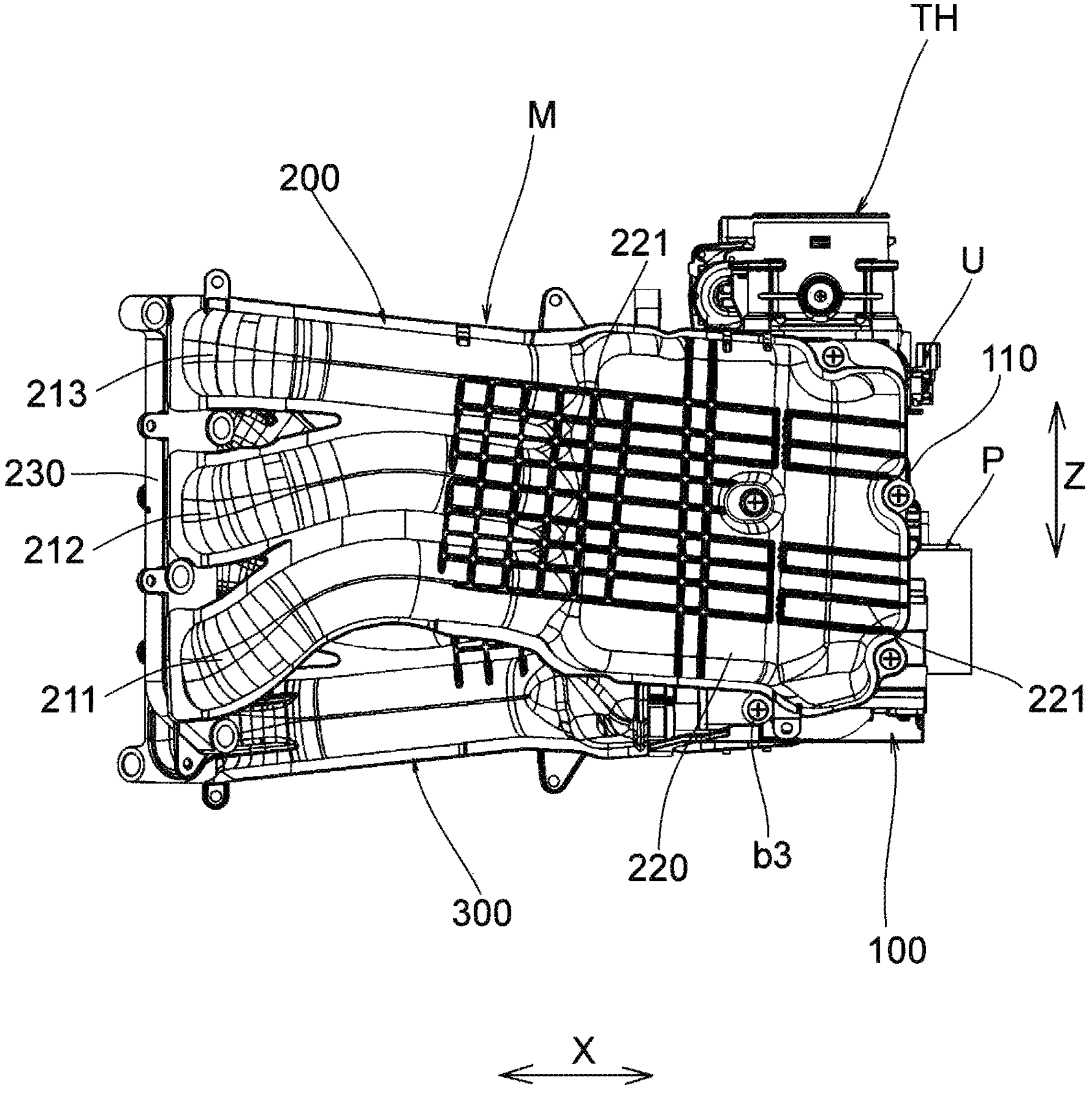
FIG. 6 is a side view illustrating the intake manifold according to an embodiment, the throttle body assembled to the surge tank, the sensor unit, and the functional component, etc., when viewed from a side surface.

The inner side wall 120 forms a portion of the outer wall, and is formed to extend in the vertical direction Z and project in the horizontal direction X in the starting state of the engine 2. As shown in FIGS. 4, 9, and 10, the inner side wall 120 includes multiple boss parts 121 (121*a*, 121*b*), a flange part 122, a lattice-shape reinforcement rib 123, boss reinforcement ribs 124, and reinforcement ribs 125.

The boss parts 121*a*, 121*b* are located at positions offset toward the lower side wall 130 in the projection part of the inner side wall 120, and the nuts N are fit into the boss holes of the boss parts 121*a* and 121*b*.

The flange part 122 is formed at a projection part of the inner side wall 120, and includes four circular holes 122. Collars C are fixed to the circular holes 122*a*. In addition, the collars Care fixed through insertion or outsertion.

As shown in FIG. 4, the lattice-like reinforcement rib 123 forms a plate shape protruding vertically from the wall surface of inner side wall 120, and is disposed in a lattice shape. In addition, by increasing the bending stiffness and the torsional stiffness, the lattice-like reinforcement rib 123 increases the overall surface stiffness, and the mechanical strength of the inner side wall 120 is increased.

As shown in FIG. 10, the boss reinforcement ribs 124 increase the stiffness of the boss part 121*a*, 121*b*, form a plate shape protruding vertically from the wall surface of the projection part of the inner side wall 120, and are connected with the boss part 121*a*, 121*b*.

That is, the four boss reinforcement ribs 124 are respectively connected to the outer circumferential surface of the boss part 121*a*, 121*b*. Here, like the above, the four boss reinforcement ribs 124 extend in a direction toward the center of the boss part 121*a*, 121*b* to be connected, and are separated in the circumferential direction of the boss part 121*a*, 121*b* to be disposed radially.

It is noted that a functional component, such as a stay supporting the intake manifold M, or other functional components are fastened and fixed to the boss parts 121*a*, 121*b* by using bolts (not shown).

As shown in FIG. 10, the reinforcement rib 125 increases the stiffness of the projection part of the inner side wall 120, and is formed in a plate shape that protrudes vertically from the wall surface.

The lower side wall 130 forms a portion of the outer wall, is disposed toward the lower side of the vertical direction Z in the starting state of the engine 2, is formed in a substantially plate shape expanding in the horizontal direction, and includes, in the central region thereof, a curved wall 131 curved to be convex toward the outer side. The curved wall 131 may be formed at a position opposite to the inlet 170 in the vertical direction Z.

The upper side wall 140 forms a portion of the outer wall, is disposed toward the upper side of the vertical direction Z in the starting state of the engine 2, and, defines, in the central region thereof, the inlet 170 and the third flange part 180 around the inlet 170.

Figure 7:
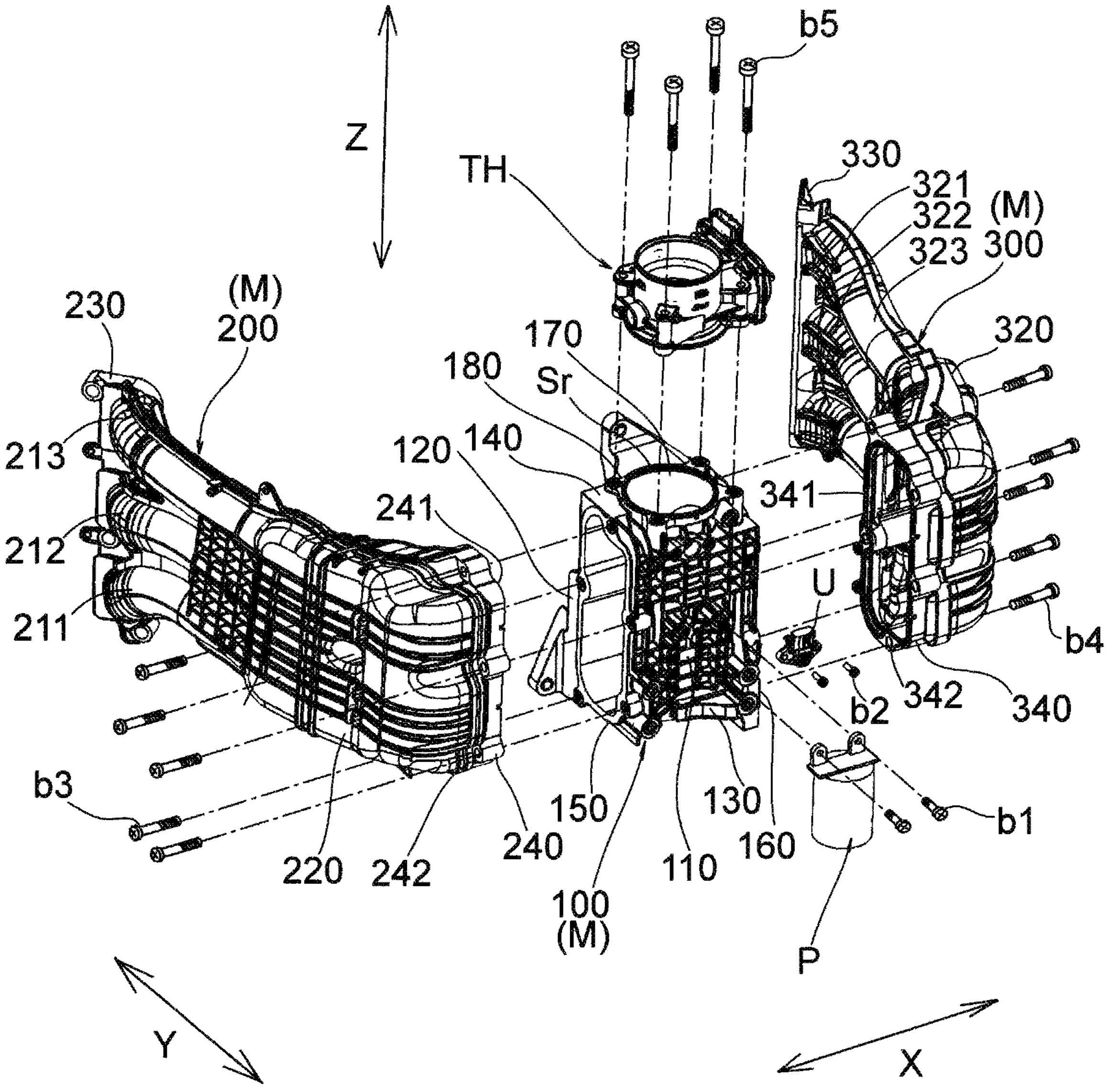
FIG. 7 is an exploded perspective view in which the intake manifold according to an embodiment, the throttle body, the sensor unit, and the functional component are dissembled.

As shown in FIGS. 7 and 9, the first flange part 150 is formed to be annular around the first opening part 100*a* on a side in the horizontal direction X, and includes a bonding surface 151 bonded to the first branch pipe module 200, five fitting holes 152, and the nuts N fit into the fitting holes 152. The nuts N are fixed to the fitting holes 152 through outsertion.

As shown in FIGS. 7 and 10, the second flange part 160 is formed to be annular around the second opening part 100*b* on the other side in the horizontal direction X, and includes a bonding surface 161 bonded to the second branch pipe module 300, five fitting holes 162, and the nuts N fit into the fitting holes 162. The nuts N are fixed to the fitting holes 162 through outsertion.

The inlet 170 is a region where the intake air passing through the throttle body TH flows toward the internal space IS, and is formed as a circular opening toward the vertical direction Z in the starting state of the engine 2.

As shown in FIGS. 7, 9, and 10, the third flange part 180 is formed to be annular around the inlet 170, and includes a bonding surface 181 bonded to the throttle body TH, four fitting holes 182, and the nuts N fit into the fitting holes 182. The nuts N are fixed to the fitting holes 182 through outsertion. The bonding surface 181 includes an annular seal groove 181*a* to be fit with an annular seal member Sr.

The first branch pipe module 200 is formed by integrating two molded bodies die-molded by using a resin material. As shown in FIGS. 3 to 7, the first branch pipe module 200 includes three branch pipes 211, 212, 213, a collection duct part 220, a flange part 230, and a flange part 240.

The three branch pipes 211, 212, 213 are formed to each define branch passages 211*a*, 212*a*, 213*a* through which the intake air flows and in communication with three intake ports of a bank (cylinder row) on a side of the engine 2.

The collection duct part 220 has multiple reinforcement ribs 221 on the outer wall thereof, is formed upstream of the three branch pipes 211, 212, 213 to define an internal space, and is in communication with the internal space IS of the surge tank 100. That is, the collection duct 220 functions as a space for temporarily storing intake air, like the surge tank 100.

The flange part 230 serves to connect the three branch pipes 211, 212, 213 with each other and is bonded to the cylinder head of the engine 2, and includes a bonding surface 231 and four circular holes 232 through which fastening bolts (not shown) pass through.

The flange part 240 is bonded to the first flange part 150 of the surge bank 100, and includes a bonding surface including an annular seal groove to be fit with an annular seal member, and five circular holes 242 through which fastening bolts b3 pass through.

The second branch pipe module 300 is formed by integrating two molded bodies die-molded by using a resin material. As shown in FIGS. 3 to 5 and FIG. 7, the second branch pipe module 300 includes three branch pipes 311, 312, 313, a collection duct part 320, a flange part 330, and a flange part 340.

The three branch pipes 311, 312, 313 are formed to each define branch passages 311*a*, 312*a*, 313*a* through which the intake air flows and be in communication with three intake ports of a bank (cylinder row) on the other side of the engine 2.

The collection duct part 320 has multiple reinforcement ribs 321 on the outer wall thereof, is formed upstream of the three branch pipes 311, 312, 313 to define an internal space, and is in communication with the internal space IS of the surge tank 100. That is, the collection duct 320 functions as a space for temporarily storing intake air, like the surge tank 100.

The flange part 330 serves to connect the three branch pipes 311, 312, 313 with each other and is bonded to the cylinder head of the engine 2, and includes a bonding surface 331 and four circular holes 332 through which fastening bolts (not shown) pass through.

The flange part 340 is bonded to the second flange part 160 of the surge bank 100, and includes a bonding surface including an annular seal groove to be fit with an annular seal member and five circular holes 342 through which fastening bolts b4 pass through.

As shown in FIGS. 13 to 16, the sensor unit U includes a case 10, a pressure sensor 20, a temperature sensor 30, a circuit substrate 40, and a terminal 50 connected with the circuit substrate 40.

The case 10 is molded by using a resin material, and includes a case body part 11, a sleeve 12 having a cylindrical shape and serving as a detection part, a bonding part 13, and a connector 14.

The sleeve 12 is formed in a cylindrical shape with an axis S1 coincident with the axis S of the fitting hole 112*a* as the center, so as to be fit to the fitting hole 112*a* of the flange part 112 and includes a passage 12*a*, a protrusion part 12*b*, and an annular groove 12*c*. The passage 12*a* reaches the pressure sensor 20 on the inner side of the sleeve 12. The protrusion part 12*b* surrounds the temperature sensor 30. The annular groove 12*c* is fit with an annular seal member $Sr_2$ (see FIG. 18) on the outer circumference.

The bonding part 13 includes two circular holes 13*a*, 13*a* for the bolts b2 to pass through on the periphery of the sleeve 12 and ring-shaped bonding surfaces 13*b*, 13*b* on the peripheries of the circular holes 13*a*, 13*a*. In addition, the bonding part 13 is provided with the circular holes 13*a*, 13*a* on two sides sandwiching the sleeve 12 along a line Ls1 perpendicular to the axis S1, and is formed to be rotationally symmetric (two-fold symmetric), i.e., point-symmetric, where the same shape is overlapped by rotating 180 degrees with the axis S1 as the center.

In other words, the two circular holes 13*a*, 13*a* correspond to the two boss parts 112*b*, 112*b* of the flange part 112. In addition, the bonding surfaces 13*b*, 13*b* are formed to be in close contact with and bonded to the bonding surface 112*c* of the flange part 112.

The connector 14 protrudes in a direction of a line Ls2 perpendicular to the axis S1 and the line Ls1 from the case body 11, and is formed to expose and surround the terminal 50 connected with the circuit substrate 40 and be connected to the outside.

In addition, the connector 14 functions as a portion of the sensor unit U that interferes with the limitation piece 113*a* provided in the vicinity of the flange part 112 at the time when the sensor unit U is assembled erroneously for being deviated from the normal orientation with respect to the flange part 12.

Figure 16:
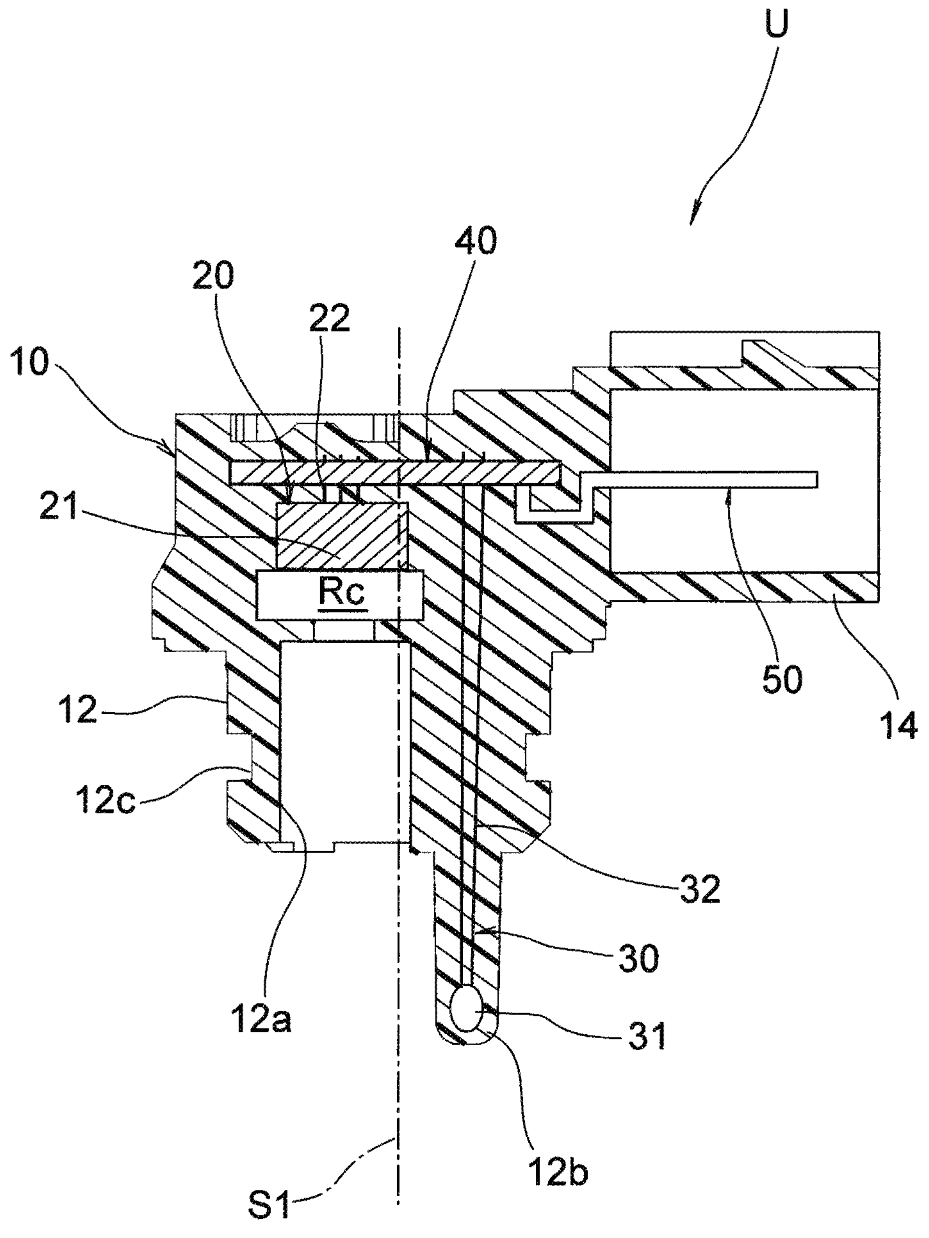
FIG. 16 is a cross-sectional view illustrating the sensor unit assembled to the intake manifold according to an embodiment.

The pressure sensor 20 is a component that detects the pressure as a state quantity of intake air, and, as shown in FIG. 16, includes a pressurized part 21, such as a diaphragm including a semiconductor strain gauge, and a lead wire 22, etc., extending from the pressurized part 21, for example. Here, the pressure sensor 20 outputs, as an electrical signal, a change of electrical resistance in accordance with a deformation amount generated in the pressurized part 21 due to a pressure of the intake air guided into a pressurized chamber Rc through the passage 12*a*.

In addition, in the state in which the sensor unit U is assembled to the intake manifold M, the pressure sensor 20 is arranged to detect the pressure of the intake air inside the surge tank 100 on the downstream side with respect to the throttle body TH.

The pressure sensor 30 is a component that detects the temperature as a state quantity of intake air, and, as shown in FIG. 16, includes a temperature sensing element 31, such as a thermistor, and a lead wire 32 extending from the temperature sensing element 31, for example.

In addition, in the state in which the sensor unit U is assembled to the intake manifold M, the temperature sensor 30 is arranged to detect the temperature of the intake air inside the surge tank 100 on the downstream side with respect to the throttle body TH.

Then, a manufacturing and assembling process of the intake manifold M with the configuration is described.

Beforehand, the surge tank 100, the first branch pipe module 200, and the second branch pipe module 300 are respectively formed through die-molding by using a resin material.

At the time of assembling, the surge tank 100, the first branch pipe module 200, the second branch pipe module 300, the nuts N, the bolts b3, b4, and the annular seal member (not shown) are prepared.

Firstly, the nuts N are assembled to the boss parts 111 (111*a* to 111*h*) of the surge tank 100 and the fitting holes 152, 162, 182 through outsertion.

Specifically, the nuts N are pressed against and fit into the boss holes of the boss parts 111, 112*b* and the fitting holes 152, 162, 182 in a state of being heated to a predetermined temperature. At this time, the inner wall part that is fit melts partially to fit the profiles of the nuts N, and after being cooled down, the nuts N are fixed.

In the outsertion process, in particular, the boss parts 111, 112 are molded to predetermined dimensions without a sink mark, etc., so the nuts N can be firmly fixed to the boss parts 111, 112*b*.

In addition, the collars C are assembled to the circular hole 122*a*. The collars C are inserted together at the time of die-molding. Nevertheless, the collars C may also be outserted after die-molding.

Then, the first branch pipe module 200 and the second branch pipe module 300 are assembled to the surge tank 100.

Firstly, in the state in which the annular seal member is fit into the annular seal groove of the bonding surface 241, the flange part 240 of the first branch pipe module 200 is bonded to the bonding surface 151 of the first flange part 150 of the surge tank 100, and the bolts b3 are inserted into the circular holes 242 and screwed into and tightened with the nuts N fit into the fitting holes 152.

Then, in the state in which the annular seal member is fit into the annular seal groove of the bonding surface 341, the flange part 340 of the second branch pipe module 300 is bonded to the bonding surface 161 of the second flange part 160 of the surge tank 100, the bolts b4 are inserted into the circular holes 342 and screwed into and tightened with the nuts N fit into the fitting holes 162.

Accordingly, the assembling process of the intake manifold M is completed. It is noted that the order of assembling the first branch pipe module 200 and the second branch pipe module 300 merely serves as an example, and the components may also be assembled in a reversed order.

Then, an assembling process of assembling various components with respect to the intake manifold M so that the intake manifold M is configured as a portion of the intake system of the engine 2 is described.

At the time of assembling, the intake manifold M, the throttle body TH, the sensor unit U, the functional component P, the annular seal members Sr, $Sr_2$, and the bolts b1, b2, b5 are prepared.

Initially, the throttle body TH is assembled to the third flange part 180 of the surge tank 100. That is, in the state in which the annular seal member Sr is fit into the annular seal groove 181*a* of the bonding surface 180 of the third flange part 180, the throttle body TH is bonded to the bonding surface 181, and the bolts b5 are screwed and tightened to the nuts N fit into the fitting holes 182.

Then, the functional component P is disposed to be opposite to the boss parts 111*a*, 111*b* formed on the outer side wall 110 of the surge tank 100, and the bolts b1 are screwed and tightened to the nuts N.

Then, the sensor unit U is assembled to the flange part 122 formed on the outer side wall 110 of the surge tank 100.

Figure 17:
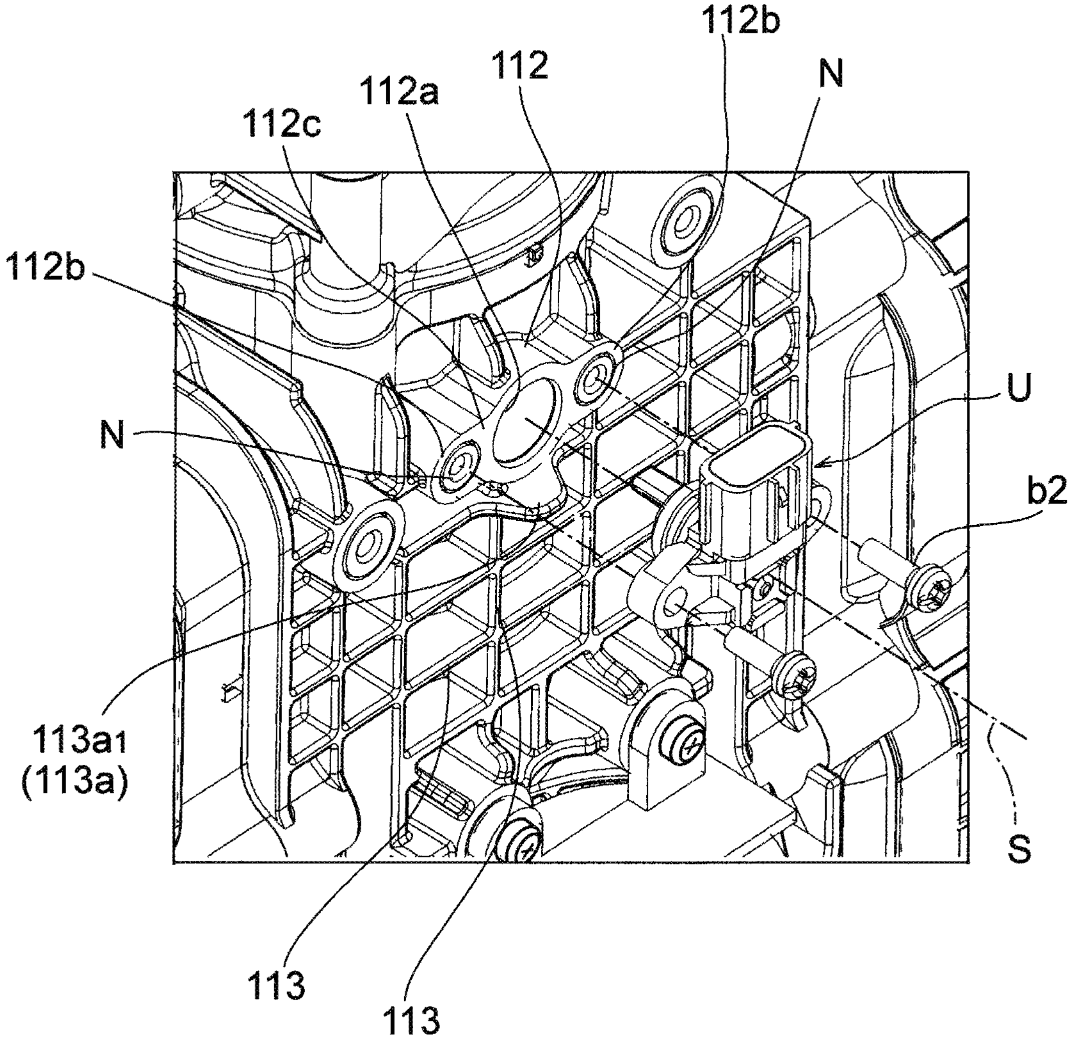
FIG. 17 is a perspective view illustrating a state in the middle of assembling the sensor unit, in a normal orientation, to the flange part of the intake manifold according to an embodiment.

Specifically, as shown in FIG. 17, the sensor unit U is oriented in the normal orientation (the connector 14 facing upward in the vertical direction Z) and approaches the outer side wall 110 of the surge tank 100, the sleeve 12 into which the annular seal member $Sr_2$ is fit is fit and pressed into the fitting hole 112*a*, and the bolts b2 are screwed and fastened to the nuts N of the boss parts 112*b* through the circular holes 13*a* in a state in which the bonding surfaces 13*b*, 13*b* are brought into close contact with the bonding surface 112*c*.

Figure 18:
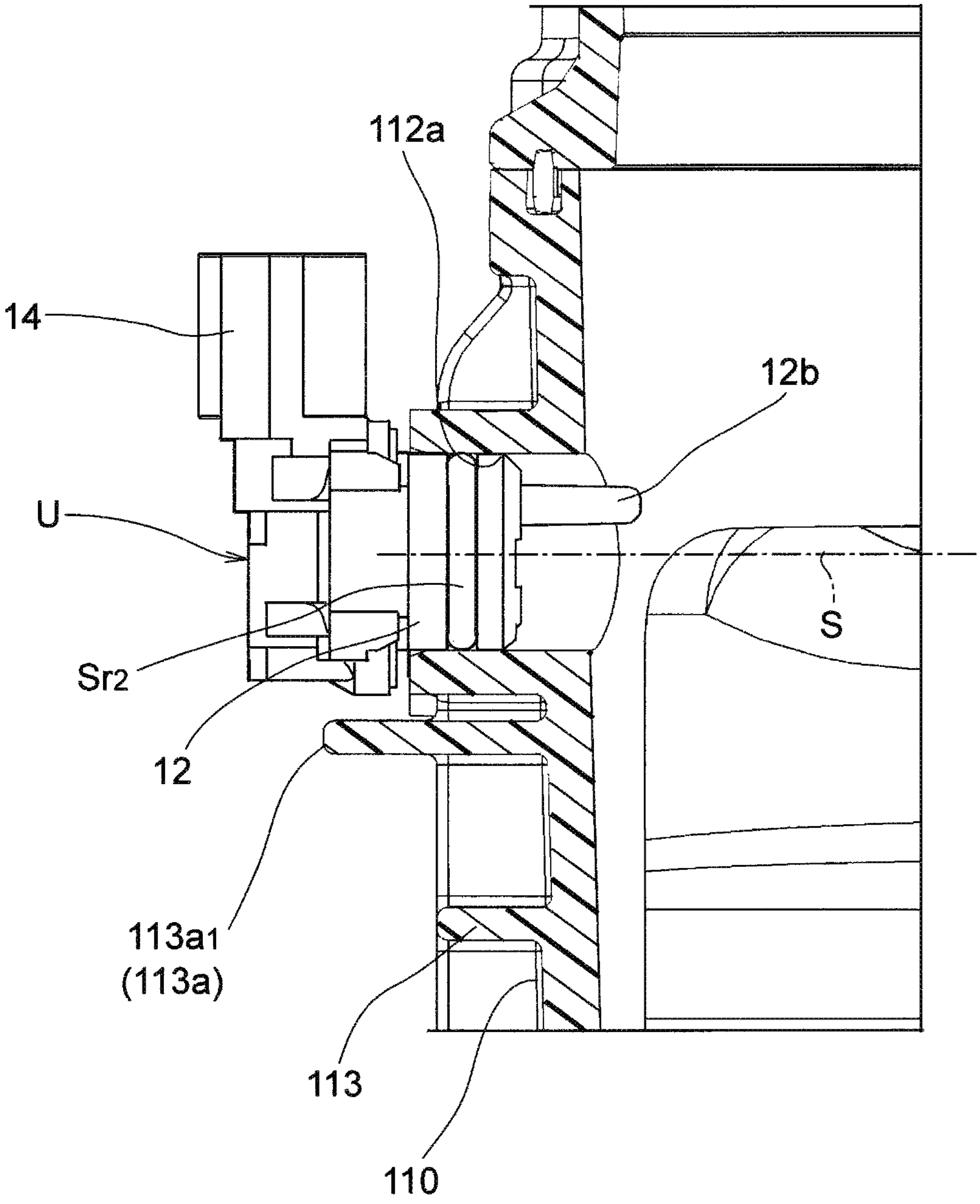
FIG. 18 is a cross-sectional view illustrating a state in which the sensor unit is assembled to the flange part of the intake manifold according to an embodiment in the normal orientation.

In the assembled state of the sensor unit U, as shown in FIG. 18, the sleeve 12 as the detection part is reliably fit with the fitting hole 112*a*, and the connector 14 is located on a side opposite to the limitation piece $\mathbf{113}a_1$ without interfering with the limitation piece $\mathbf{113}a_1$.

Figure 19:
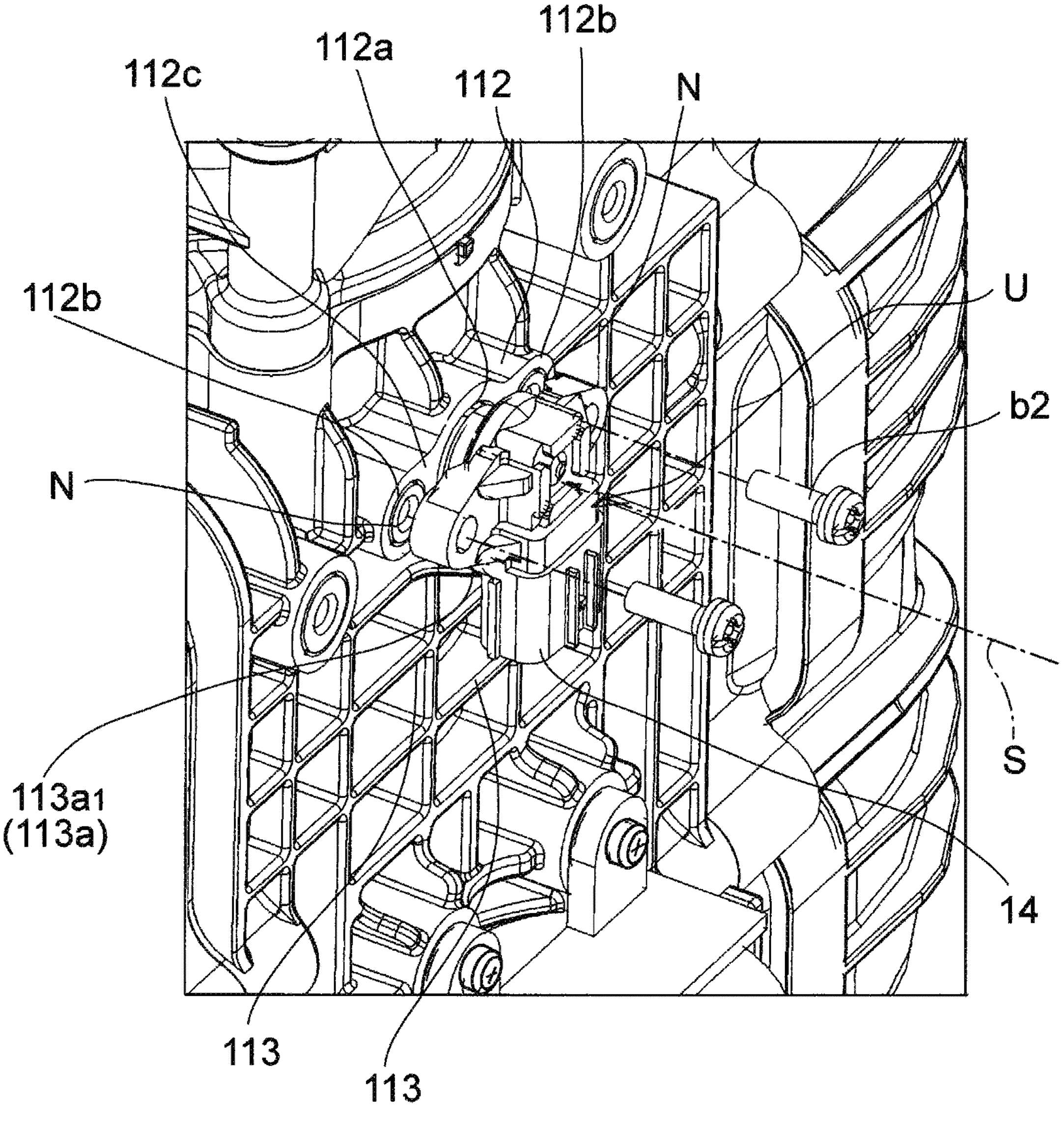
FIG. 19 is a perspective view illustrating a state in which the senor unit is erroneously assembled in an incorrect orientation (reversed by 180 degrees) to the flange part of the intake manifold according to an embodiment.
Figure 20:
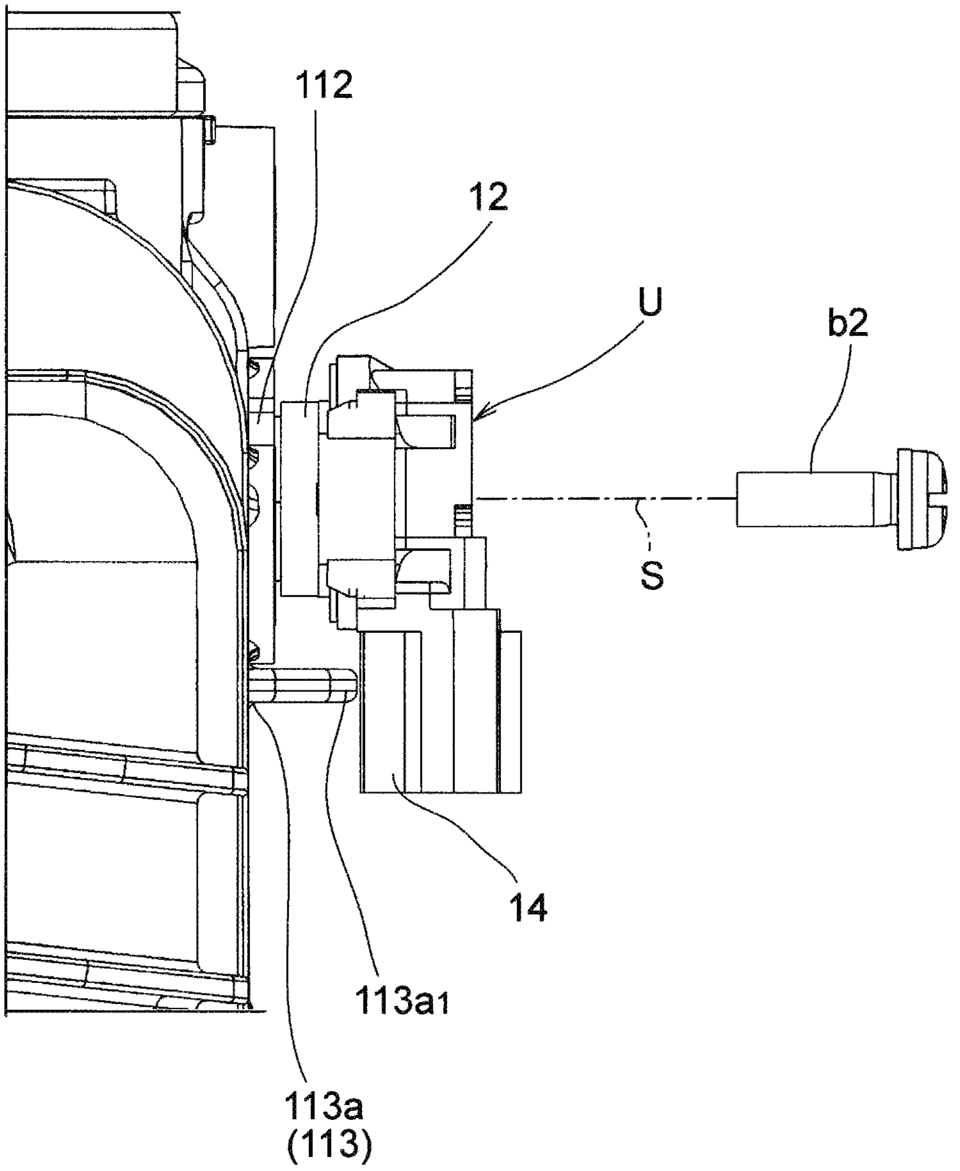
FIG. 20 is a side view illustrating the state in which the senor unit is erroneously assembled in the incorrect orientation (reversed by 180 degrees) to the flange part of the intake manifold according to an embodiment.
Figure 21:
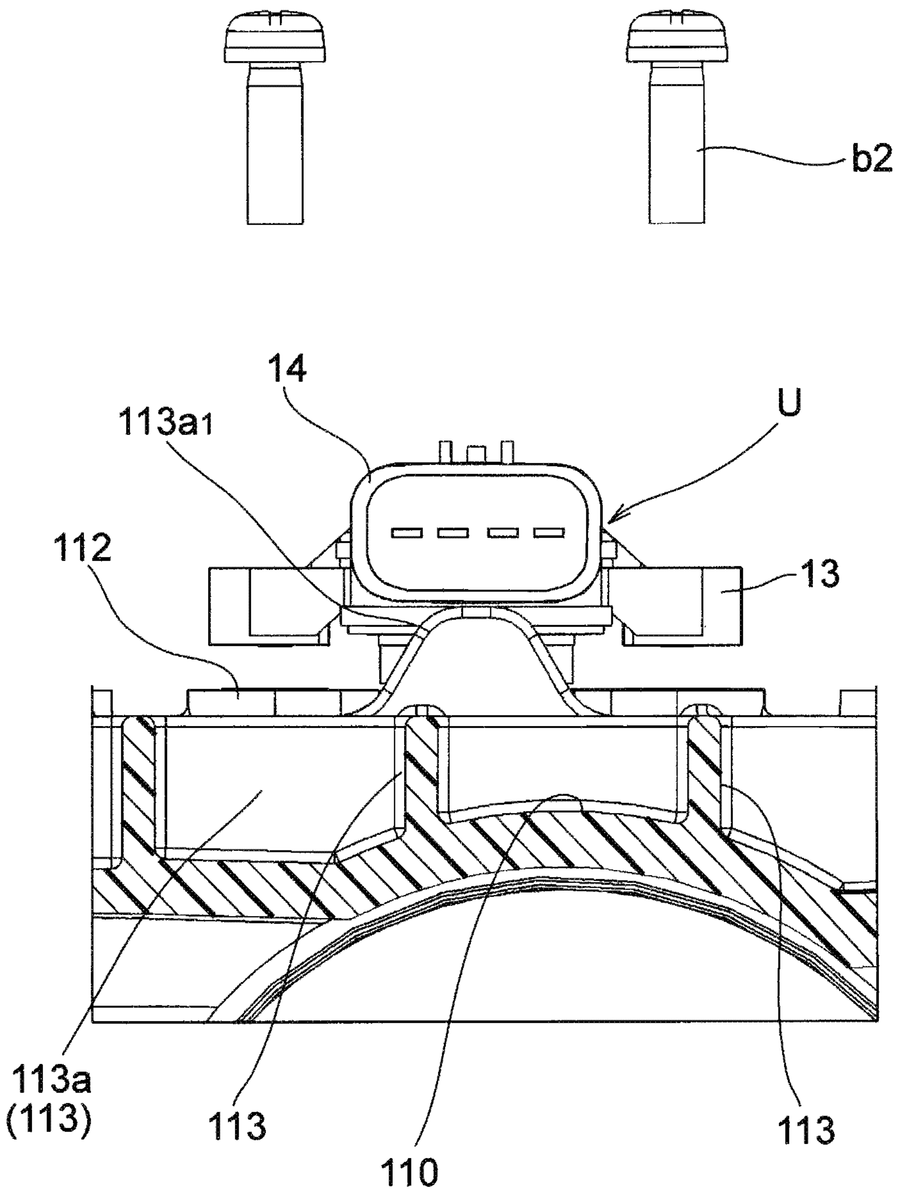
FIG. 21 is a partial cross-sectional view illustrating a state in which a connector of the sensor unit interferes with a limitation piece in the erroneously assembled state shown in FIGS. 19 and 20.

Here, it is assumed that, when the sensor unit U is assembled incorrectly, where the sensor unit U is assembled in a direction deviated from the normal orientation (the connector 14 faces downward in the vertical direction), as shown in FIGS. 19 to 21, the connector 14 as a portion of the sensor unit U interferes with the limitation piece $\mathbf{113}a_1$ of the surge tank 100 formed in the vicinity of the flange part 112, and the assembling is thereby limited.

Accordingly, by noticing that the orientation of the sensor unit U is incorrect and visually recognizing the limitation piece $\mathbf{113}a_1$, the operator may rotate 180 degrees so that the connector 14 faces upward, and the sensor unit U can be assembled in the correct orientation. Accordingly, the sensor unit U is prevented from being assembled erroneously.

Moreover, various functional components may be assembled to other boss parts 111 (111*c*, 111*d*, 111*e*, 111*f*, 111*g*, 111*h*, 121*a*, 121*b*) when necessary.

As described above, the intake manifold M according to an embodiment includes: the surge tank 100, die-molded to temporarily store the intake air; and the branch pipes 211, 212, 213, 311, 312, 313, in communication with the surge tank. The surge tank 100 includes, on the outer wall of the surge tank 100, the flange part 112 and the reinforcement rib (the parallel reinforcement rib 113*a* forming a portion of the lattice-like reinforcement rib 113). The sensor unit U configured to detect a state quantity of the intake air is installed to the flange part 112. The flange part 112 includes: the fitting hole 112*a*, having the predetermined axis S as the center so as to be fit with the detection part (sleeve 12) of the sensor unit U; and boss parts 112*b*, 112*b*, provided on the periphery of the fitting hole 112*a*. The flange part 112 is formed to be rotationally symmetric with the axis S as a center. The reinforcement rib (parallel reinforcement rib 113$a$) includes the limitation piece 113$a_1$ interfering with a portion of the sensor unit U to limit assembling at the time when the sensor unit U is assembled erroneously for being deviated from the normal orientation. Therefore, an assembling error can be prevented from occurring at the time of assembling the sensor unit U, and mechanical strength can be secured.

In addition, the outboard motor formed with the configuration includes: the engine 2, having the intake manifold; the body 1, to which the engine 2 is fixed; the propeller 4, configured to be rotated by the driving force of the engine 2; the sensor unit U, assembled to the intake manifold M and detecting the state quantity of the intake air; and the engine cover 3, covering the engine 2. The outboard motor includes the intake manifold M with the configuration as the intake manifold. Therefore, the sensor unit U can be assembled in the normal orientation, and a reliable outboard motor can be obtained.

In the above embodiment, as the configuration in which the flange part, which is formed on the outer side wall 110 of the surge tank 100 and to which the sensor unit is assembled, and the bonding part of the sensor unit are rotationally symmetric, the flange part 112 and the bonding part 13 in two-fold symmetry where the same shape is overlapped by rotating 180 degrees, that is, in point symmetry, are shown herein. However, the invention is not limited thereto. A configuration of three-fold symmetry, where three boss parts are disposed at intervals of 120 degrees, or other configurations of n-fold symmetry (n being a natural number of 4 or more) may also be adopted.

In the above embodiment, as the limitation piece, the limitation piece 113$a_1$ having the curved outer profile in a convex shape is shown. However, the invention is not limited thereto. Limitation pieces in other configurations may also be adopted as long as the limitation piece is integrally formed as a portion of the reinforcement rib disposed in the vicinity of the flange part. In the above embodiment, as the reinforcement rib where the limitation piece is formed, the case of the parallel reinforcement rib 113$a$ forming a portion of the lattice-like reinforcement rib 113 is shown. However the invention is not limited thereto. A configuration in which the limitation piece is formed on the parallel reinforcement rib protruding in parallel in the vicinity of the flange part may also be adopted.

In the embodiment, as the sensor unit, the sensor unit U including the pressure sensor 20 and the temperature sensor 30 is shown. However, the invention is not limited thereto. A sensor unit including only the pressure sensor, a sensor unit including only the temperature sensor, or a sensor unit including other sensors may also be adopted.

In the above embodiment, the case where the connector 14 interfering with the limitation piece 113$a$ and serving as a portion of the sensor unit U is adopted is shown. However, the invention is not limited thereto. Other portions may also be adopted as the portion of the sensor unit interfering with the limitation piece 113$a_1$.

In the above embodiment, a configuration in which the nuts N are outserted to the boss parts 111, 112$b$ and the fitting holes 152, 162, 182 is shown. However, the invention is not limited thereto. In the case where an aluminum material is used, in place of resin material, for die-molding, female screws may also be formed through post-processing on the boss holes of the boss parts and the fitting holes.

Although the above embodiment illustrates the case where the nuts N are fixed to the boss parts 111, 112$b$ and the fitting holes 152, 162, 182 through outsertion, the invention is not limited thereto. The nuts N may also be fixed through insertion.

In the embodiment, as the intake manifold, the intake manifold M formed by the surge tank 100, the first branch pipe module 200, and the second branch pipe module 300 is shown. However, the invention is not limited thereto. Intake manifolds of other separate configurations, or, if die-molding is possible, an intake manifold that is integrally molded as a whole may also be adopted.

As described above, according to the intake manifold of the invention, at the time of assembling the sensor unit, erroneous assembling can be prevented, and mechanical strength can be secured. Therefore, in addition to being applicable to the engine of the outboard motor, the intake manifold according to the invention is also applicable as the intake manifold of other engines.

What is claimed is:

1. An intake manifold, suitable for an engine, the intake manifold comprising: a surge tank, die-molded to temporarily store intake air; and a plurality of branch pipes, in communication with the surge tank, wherein the surge tank comprises, on an outer wall of the surge tank, a flange part and a reinforcement rib, a sensor unit configured to detect a state quantity of the intake air being installed to the flange part, the flange part comprises: a fitting hole, having a predetermined axis as a center so as to be fit with a detection part of the sensor unit; and two boss parts arranged on a first line and formed to be point-symmetric with the axis as a center, the first line is perpendicular to the axis, the reinforcement rib comprises: a parallel reinforcement rib extending in parallel with the first line in a vicinity of the flange part; and a limitation piece interfering with a portion of the sensor unit to limit assembling at a time when the sensor unit is assembled erroneously for being deviated from a normal orientation, wherein the limitation piece is formed on the parallel reinforcement rib and has a curved outer profile in a convex shape.

2. The intake manifold as claimed in claim 1, wherein the limitation piece is formed with a thickness same as a plate thickness of the reinforcement rib and is formed to protrude in parallel with the axis.

3. The intake manifold as claimed in claim 1, wherein the flange part has a bonding surface perpendicular to the axis, so as to be bonded to a bonding part of the sensor unit, and
the limitation piece is formed to protrude with respect to the bonding surface in a direction of the axis.

4. The intake manifold as claimed in claim 1, wherein the limitation piece is formed to be line-symmetric with respect to a second line, and wherein the second line is perpendicular to the axis and the first line.

5. The intake manifold as claimed in claim 1, wherein at least a portion of the outer wall of the surge tank comprises a plate-shaped outer wall formed in a plate shape,
the flange part is formed on the plate-shaped outer wall,
the reinforcement rib comprises a lattice-like reinforcement rib formed on the plate-shaped outer wall, and
the limitation piece is formed on the lattice-like reinforcement rib.

6. The intake manifold as claimed in claim 1, wherein the surge tank comprises nuts outserted to the two boss parts.

7. The intake manifold as claimed in claim 1, wherein the branch pipes comprise a first branch pipe module and a second branch pipe module each defining at least one branch passage, and
the surge tank is formed in a cylindrical shape defining a first opening part and a second opening part on both ends, and comprises: a first flange part, connected with the first branch pipe module on a periphery of the first opening part; a second flange part, connected with the second branch pipe module on a periphery of the second opening part; an inlet, through which the intake air flows in; and a third flange part, connected with a throttle body on a periphery of the inlet.

8. An outboard motor, comprising:

an engine, having an intake manifold;

a body, to which the engine is fixed;

a propeller, configured to be rotated by a driving force of the engine;

a sensor unit, assembled to the intake manifold and detecting a state quantity of intake air; and an engine cover, covering the engine, wherein the intake manifold is the intake manifold as claimed in claim 1.

9. The outboard motor as claimed in claim 8, wherein the sensor unit comprises: a detection part, fit with the fitting hole of the intake manifold; a bonding part, integrally formed with the detection part and bonded to the flange part of the intake manifold;

and a connector for electrical connection.

10. The outboard motor as claimed in claim 9, wherein the connector is formed to interfere with the limitation piece of the intake manifold at the time when the sensor unit is assembled erroneously for being deviated from the normal orientation.

11. The outboard motor as claimed in claim 8, wherein the sensor unit comprises: a pressure sensor, detecting a pressure of the intake air; and a temperature sensor, detecting a temperature of the intake air.

* * * * *